United States Patent
Itagaki

(10) Patent No.: US 12,517,678 B2
(45) Date of Patent: Jan. 6, 2026

(54) MEMORY SYSTEM

(71) Applicant: Kioxia Corporation, Tokyo (JP)

(72) Inventor: Kiyotaro Itagaki, Ota Tokyo (JP)

(73) Assignee: Kioxia Corporation, Tokyo (JP)

( * ) Notice: Subject to any disclaimer, the term of this patent is extended or adjusted under 35 U.S.C. 154(b) by 77 days.

(21) Appl. No.: 18/409,481

(22) Filed: Jan. 10, 2024

(65) Prior Publication Data

US 2024/0319917 A1 Sep. 26, 2024

(30) Foreign Application Priority Data

Mar. 22, 2023 (JP) ................. 2023-045098

(51) Int. Cl.
*G06F 3/06* (2006.01)
(52) U.S. Cl.
CPC .......... *G06F 3/0658* (2013.01); *G06F 3/0604* (2013.01); *G06F 3/0659* (2013.01); *G06F 3/0679* (2013.01)
(58) Field of Classification Search
CPC .... G06F 3/0658; G06F 3/0604; G06F 3/0659; G06F 3/0679
USPC .................................................. 365/189.011
See application file for complete search history.

(56) References Cited

U.S. PATENT DOCUMENTS

| | | | | |
|---|---|---|---|---|
| 9,299,436 B2 * | 3/2016 | Nakamura | ........... | G11C 7/1051 |
| 11,876,067 B2 * | 1/2024 | Yang | ........... | H01L 24/85 |
| 2006/0077721 A1 * | 4/2006 | Sugio | ........... | G11C 16/16 |
| | | | | 365/185.33 |
| 2014/0185389 A1 * | 7/2014 | Jeon | ........... | G11C 7/222 |
| | | | | 365/189.05 |
| 2015/0262630 A1 | 9/2015 | Shirakawa et al. | | |
| 2022/0317932 A1 | 10/2022 | Sugahara et al. | | |
| 2023/0027964 A1 * | 1/2023 | Park | ........... | H01L 23/66 |
| 2023/0066699 A1 * | 3/2023 | Lyu | ........... | G11C 8/06 |
| 2023/0282257 A1 * | 9/2023 | Kurosawa | ........... | G11C 16/26 |
| | | | | 365/233.1 |
| 2024/0283628 A1 * | 8/2024 | Han | ........... | G06F 13/4273 |
| 2024/0347087 A1 * | 10/2024 | Lu | ........... | G11C 16/0483 |
| 2025/0201288 A1 * | 6/2025 | Sugahara | ........... | G11C 7/1048 |

FOREIGN PATENT DOCUMENTS

| | | | |
|---|---|---|---|
| JP | 2015-176309 A | 10/2015 | |
| JP | 2022-154323 A | 10/2022 | |

* cited by examiner

*Primary Examiner* — Ly D Pham
(74) *Attorney, Agent, or Firm* — Kim & Stewart LLP

(57) ABSTRACT

According to one embodiment, a memory system includes semiconductor storage devices and a controller device. Each semiconductor storage device includes: first and second signal pads through which command data and address data for instructing one of the semiconductor storage devices to perform a read operation are transmitted; and a status register. A controller device is configured to instruct the one of the semiconductor storage devices to provide a status of the read operation. The one of the semiconductor storage devices is configured to, upon receiving the instruction to provide the status of the read operation, output a ready/busy state stored in the status register through the first signal pad while allowing an input of another command data and another address data through the second signal pad.

24 Claims, 25 Drawing Sheets

FIG. 8
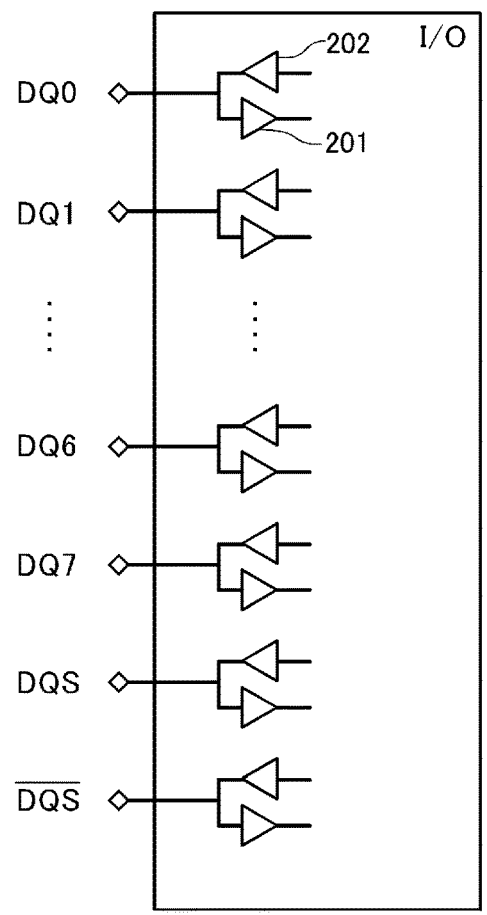
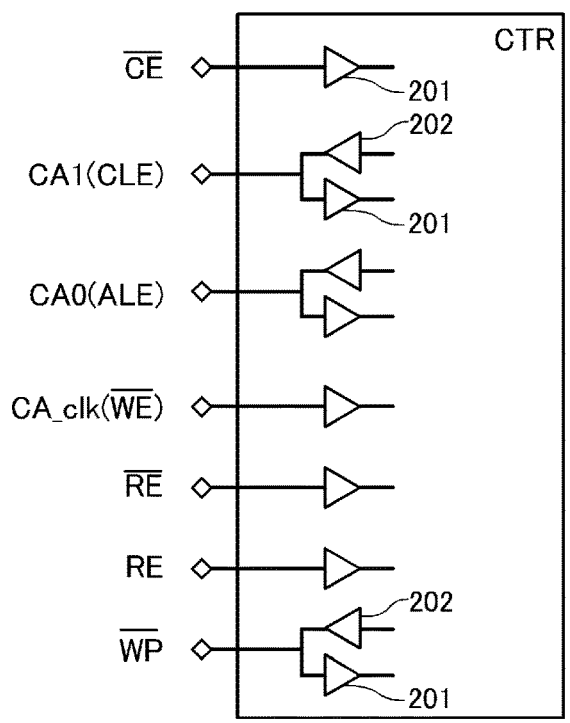

FIG. 11

| Header Rising Edge | | Header Falling Edge | | Definition |
|---|---|---|---|---|
| CA1(CLE) | CA0(ALE) | CA1(CLE) | CA0(ALE) | |
| 0 | 0 | 0 | 0 | DOUT |
| 0 | 0 | 0 | 1 | DIN |
| 0 | 0 | 1 | 0 | ADD |
| 0 | 0 | 1 | 1 | CMD |
| 0 | 1 | 0 | 0 | TRG |
| 0 | 1 | 0 | 1 | R/B output |
| | | . | | |
| | | . | | |
| | | . | | |

MEMORY SYSTEM

CROSS-REFERENCE TO RELATED APPLICATION(S)

This application is based upon and claims the benefit of priority from Japanese Patent Application No. 2023-045098, filed on Mar. 22, 2023, the entire contents of which are incorporated herein by reference.

FIELD

Embodiments described herein relate generally to a memory system.

BACKGROUND

A memory system that includes a plurality of semiconductor storage devices and a control device is known. A semiconductor storage device includes a memory cell array including a string in which a plurality of memory cell transistors are connected in series.

DESCRIPTION OF THE DRAWINGS

FIG. 8 is a schematic circuit diagram illustrating a configuration of a part of the memory die.

FIG. 11 is a schematic table showing exemplary definitions for a header set.

DETAILED DESCRIPTION

Figure 1:
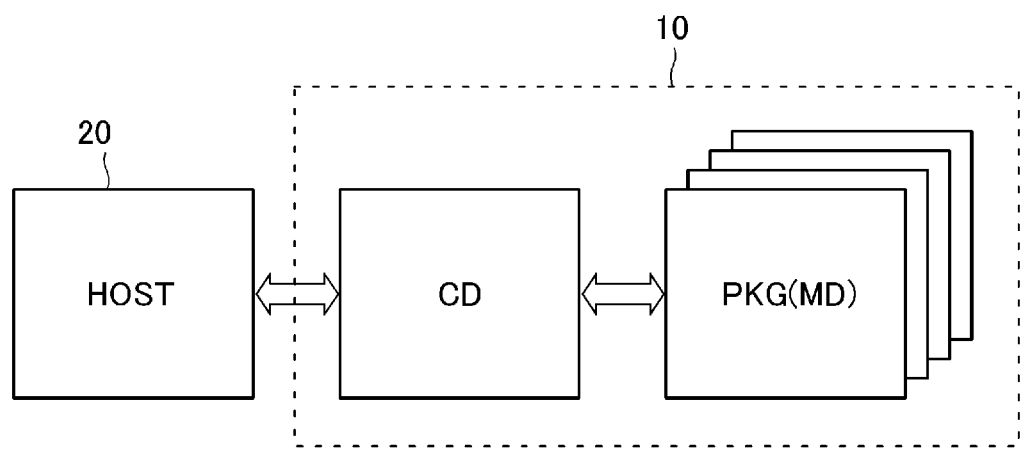
FIG. 1 is a schematic block diagram illustrating a configuration of a memory system according to an embodiment.

In general, according to one embodiment, a memory system includes a plurality of semiconductor storage devices and a controller device. Each of the plurality of semiconductor storage devices includes: first and second signal pads through which command data and address data for instructing one of the semiconductor storage devices to perform a read operation are transmitted; a memory cell array including a string in which a plurality of memory cell transistors are connected in series; and a status register. A controller device is configured to instruct the one of the semiconductor storage devices to provide a status of the read operation executed by the one of the semiconductor storage devices. The one of the semiconductor storage devices is configured to, upon receiving the instruction to provide the status of the read operation, output a ready/busy state of the one of the semiconductor storage devices that is stored in the status register through the first signal pad while allowing an input of another command data and another address data through the second signal pad.

Hereinafter, a memory system according to an embodiment is specifically described with reference to the drawings. The following embodiments are merely examples and are not intended to limit the present disclosure. For convenience of description, some configurations may be omitted. Further, parts common to a plurality of embodiments are given the same reference numerals, and description thereof may be omitted.

In the present specification, the term "memory system" may refer to a system including a controller die, such as a memory card or a solid state drive (SSD). The "memory system" may also mean a configuration including a host computer, such as a smart phone, a tablet terminal, or a personal computer.

In the present specification, when a first configuration is said to be "electrically connected" to a second configuration, the first configuration may be directly connected to the second configuration, or the first configuration may be connected to the second configuration via wiring, a semiconductor member, a transistor, or the like. For example, when three transistors are connected in series, even if the second transistor, which is between the first and third transistors, is in an OFF state, the first transistor is "electrically connected" to the third transistor.

In the present specification, when the first configuration is said to be "connected between" the second configuration and the third configuration, it may mean that the first configuration, the second configuration, and the third configuration are connected in series, and the second configuration is connected to the third configuration via the first configuration.

In the present specification, a predetermined direction parallel to the upper surface of the substrate is referred to as the X direction, a direction parallel to the upper surface of the substrate and perpendicular to the X direction is referred to as the Y direction, and a direction perpendicular to the upper surface of the substrate is referred to as the Z direction.

In the present specification, with respect to a configuration, member, and the like, it may also mean the term "width" in a predetermined direction, or the like refers to a "width" in a cross section observed by a scanning electron microscopy (SEM), a transmission electron microscopy (TEM), or the like.

Embodiments

Memory System 10

FIG. 1 is a schematic block diagram illustrating a configuration of a memory system 10 according to an embodiment. The memory system 10 reads, writes, and erases user data according to a signal transmitted from a host computer 20. The memory system 10 is, for example, a memory card, an SSD, or another system that can store user data. The memory system 10 may include a plurality of packages PKG and a controller die CD connected to the plurality of packages PKG and the host computer 20. Each package PKG includes a plurality of memory dies MD. Each memory die MD can store user data. The controller die CD includes, for example, a processor, a RAM, and the like and performs processes such as conversion of a logical address and a physical address, bit error detection/correction, garbage collection (also referred to as "compaction"), and wear leveling.

Figure 2A:
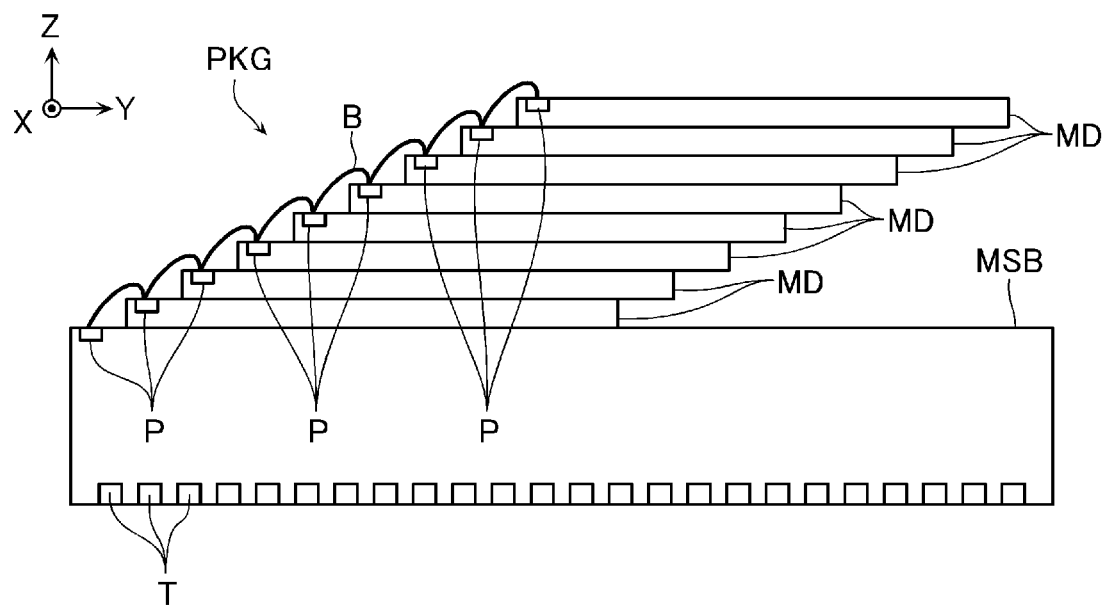
FIG. 2A is a schematic side view illustrating a configuration example of a package.
Figure 2B:
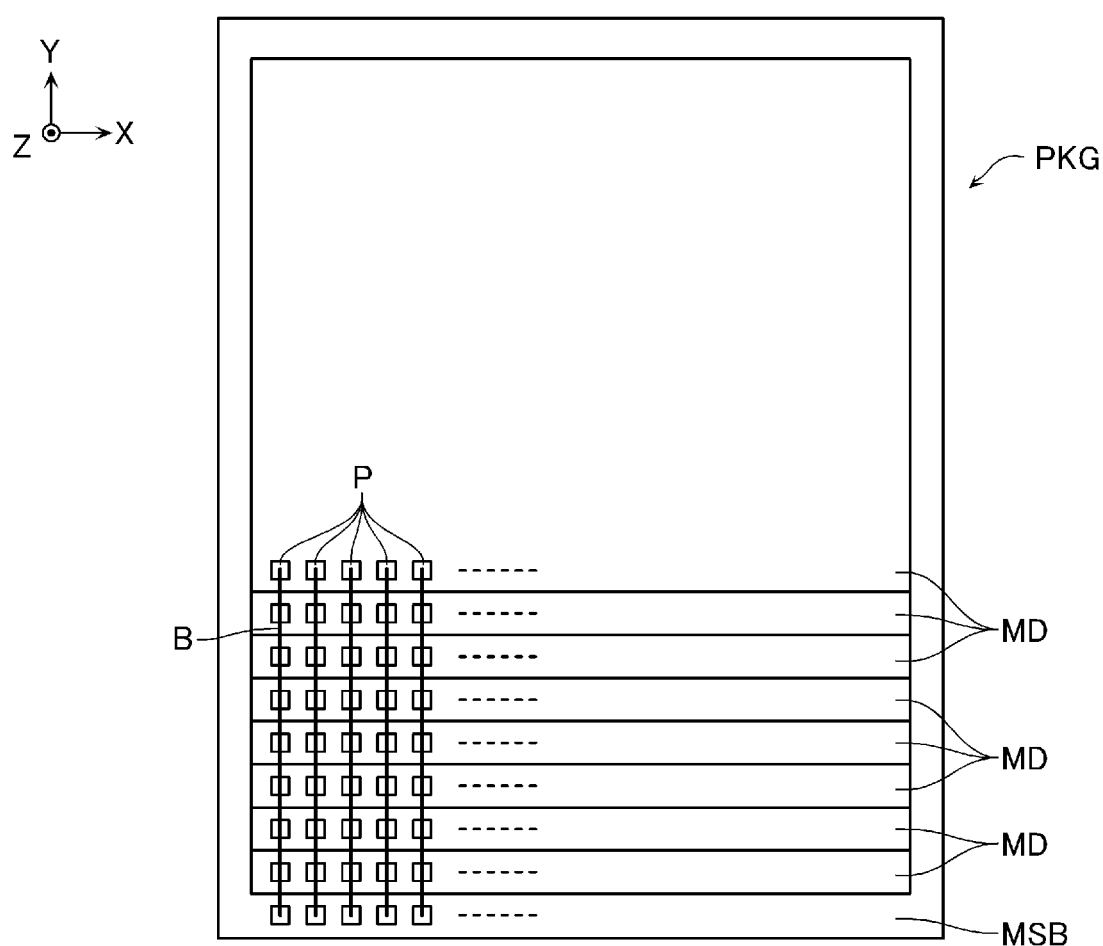
FIG. 2B is a schematic plan view illustrating the configuration example of the package.
Figure 3:
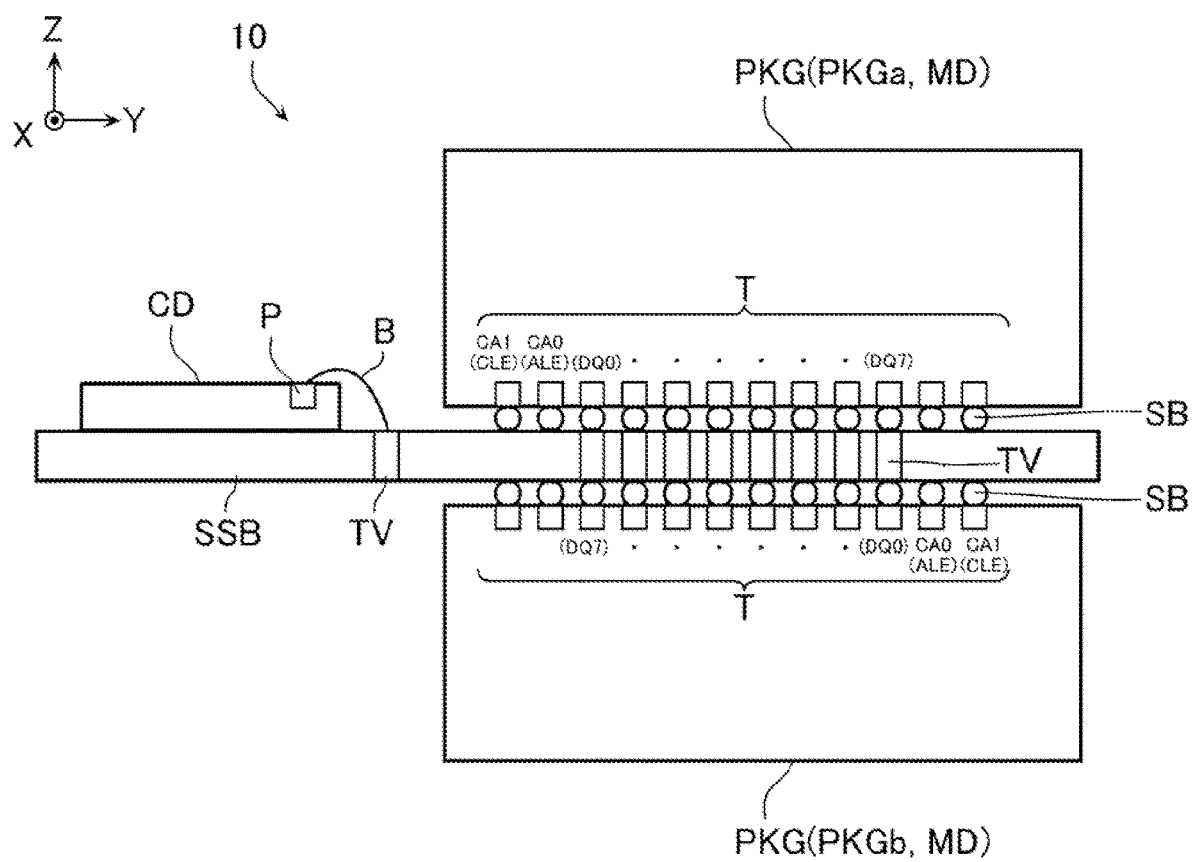
FIG. 3 is a schematic side view illustrating the configuration example of the memory system.

FIGS. 2A and 2B are diagrams illustrating a configuration example of the package PKG provided in the memory system 10 according to the present embodiment. More specifically, FIG. 2A is a schematic side view illustrating a configuration example of the package PKG, and FIG. 2B is a schematic plan view illustrating a configuration example of the package PKG. FIG. 3 is a schematic side view illustrating a configuration example of the memory system 10. For convenience of description, some configurations may be omitted from FIGS. 2A, 2B, and 3.

As illustrated in FIG. 2A, the package PKG according to the present embodiment includes a memory die mounting board MSB, and the plurality of memory dies MD stacked on the memory die mounting board MSB. On the upper surface of the memory die mounting board MSB, pad electrodes P are provided in the end portion in the Y direction, and the neighboring portion is adhered to the lower surface of the lowermost one of the memory dies MD via adhesive or the like. On the upper surface of each of the memory dies MD, the pad electrodes P are provided in the end portion in the Y direction, and the remaining portion is adhered to the lower surface of the upper-side neighboring memory die MD via adhesive or the like. The pad electrodes P of one of the plurality of memory dies MD are connected to the pad electrodes P of another one of the plurality of memory dies MD, respectively. In other words, among the plurality of memory dies MD, the pad electrodes P at corresponding positions are commonly connected to respective bonding wires B. Electrode terminals T are provided at the lower surface of the memory die mounting board MSB. The pad electrodes P on the upper surface of the memory die mounting board MSB are connected to the electrode terminals T on the lower surface, respectively. The memory die mounting board MSB is, for example, a grid array board. On the upper surface of the memory die mounting board MSB, the plurality of memory dies MD and the bonding wires B are covered with, for example, a sealing resin (not illustrated).

As illustrated in FIG. 2B, the memory die mounting board MSB and the plurality of memory dies MD include the plurality of pad electrodes P located along the X direction, respectively. The plurality of pad electrodes P of the memory dies MD respectively correspond to control terminals/CE, CA1 (CLE), CA0 (ALE), CA_clk (/WE), /RE, RE, and/WP, data signal input/output terminals DQ0 to DQ7, data strobe signal input/output terminals DQS and /DQS, and a terminal RY/BY, which will be described later with reference to FIG. 4.

The plurality of pad electrodes P provided on the memory die mounting board MSB and the plurality of memory dies MD are connected to each other via the bonding wires B, respectively. For example, the pad electrodes P corresponding to the control terminals CA1 (CLE) among the plurality of memory dies MD are connected to each other, and the pad electrodes P corresponding to the control terminals CA0 (ALE) are connected to each other. The same is applied to other terminals. The pad electrode P of each memory die MD in the package PKG is connected to the outside of the package PKG via the electrode terminal T on the lower surface of the memory die mounting board MSB.

FIG. 3 is a schematic side view illustrating a configuration example of the memory system 10 according to the present embodiment. The memory system 10 includes a system mounting board SSB, the plurality of packages PKG (each of which includes the plurality of memory dies MD) and the controller die CD. The plurality of packages PKG and the controller die CD are located on the system mounting board SSB. On the upper surface of the system mounting board SSB, the controller die CD and a part of the plurality of packages PKG are located. On the lower surface of the system mounting board SSB, a remaining part of the plurality of package PKG is located.

The plurality of pad electrodes P are provided on the controller die CD. The pad electrodes P of the controller die CD are connected to the system mounting board SSB via the respective bonding wires B. The electrode terminals T of the plurality of packages PKG are connected to the system mounting board SSB via respective solder balls SB. The pad electrodes P of the controller die CD and the electrode terminals T of the plurality of packages PKG are connected via respective wirings (not illustrated) formed on the upper surface and the lower surface of the system mounting board SSB. The wirings formed on the upper surface and the wirings formed on the lower surface of the system mounting board SSB are connected via respective through vias TV.

Some of the electrode terminals T of the package PKG located on the upper surface of the system mounting board SSB and some of the electrode terminals T of the package PKG located on the lower surface of the system mounting board SSB are connected to each other via the through vias TV. More specifically, the electrode terminals T corresponding to the data signal input/output terminals DQ0 to DQ7 in the package PKG located on the upper surface of the system mounting board SSB and the electrode terminals T corresponding to the data signal input/output terminals DQ0 to DQ7 in the package PKG located on the lower surface of the system mounting board SSB may be connected to each other via the respective through vias TV.

More specifically, when the packages PKG have the same configuration, for example, the electrode terminal T corresponding to the data signal input/output terminal DQ0 in one package PKG is connected to the electrode terminal T corresponding to the data signal input/output terminal DQ7 in the other package PKG (FIG. 3). Here, the one package PKG is referred to as a forward connection package PKGa, and the other package PKG is referred to as a reverse connection package PKGb. The electrode terminals T corresponding to the data signal input/output terminals DQ0, DQ1, DQ2, DQ3, DQ4, DQ5, DQ6, and DQ7 in the forward connection package PKGa are respectively connected to the electrode terminals T corresponding to the data signal input/output terminals DQ7, DQ6, DQ5, DQ4, DQ3, DQ2, DQ1, and DQ0 in the reverse connection package PKGb. Such a connection method is referred to as mirror connection.

The electrode terminals T corresponding to the other control terminal may be individually connected to the pad electrode P of the controller die CD. For example, the electrode terminal T corresponding to the control terminal CA1 (CLE) in the one package PKG (the forward connection package PKGa) and the electrode terminal T corresponding to the control terminal CA1 (CLE) in the other package PKG (the reverse connection package PKGb) are connected to the pad electrode P of the controller die CD via different wirings, respectively. Also, the electrode terminal T corresponding to the control terminal CA0 (ALE) in the one package PKG (the forward connection package PKGa) and the electrode terminal T corresponding to the control terminal CA0 (ALE) in the other package PKG (the reverse connection package PKGb) are connected to the pad electrode P of the controller die CD via different wirings, respectively.

The configurations illustrated in FIGS. 2A, 2B and 3 are merely examples, and the specific configurations may be adjusted as appropriate. For example, in the example illustrated in FIGS. 2A and 2B, the plurality of memory dies MD are stacked, and these configurations are connected to each other via the bonding wires B. However, the plurality of memory dies MD may be connected to each other not via the bonding wire B but via through vias formed inside the respective memory dies or the like. Also, in the example illustrated in FIG. 3, an example in which the electrode terminals T (the data signal input/output terminals DQ0 to DQ7) of the package PKG arranged on and beneath the system mounting board SSB are mirror-connected by the through via TV is provided. However, the electrode terminals T (the data signal input/output terminals DQ0 to DQ7) of the package PKG may not be mirror-connected.

Configuration of Memory Die MD

Figure 4:
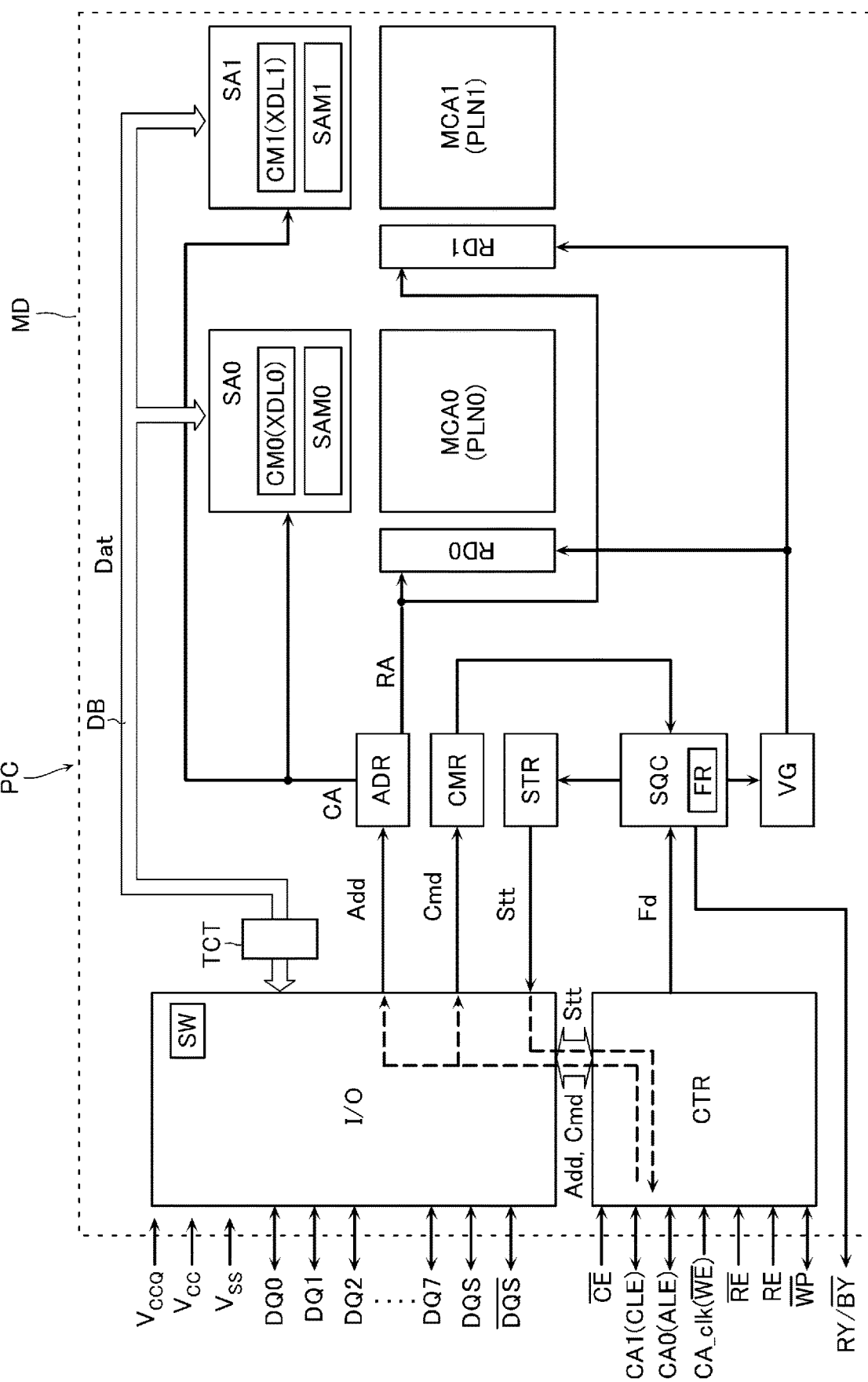
FIG. 4 is a schematic block diagram illustrating a configuration of a memory die.
Figure 5:
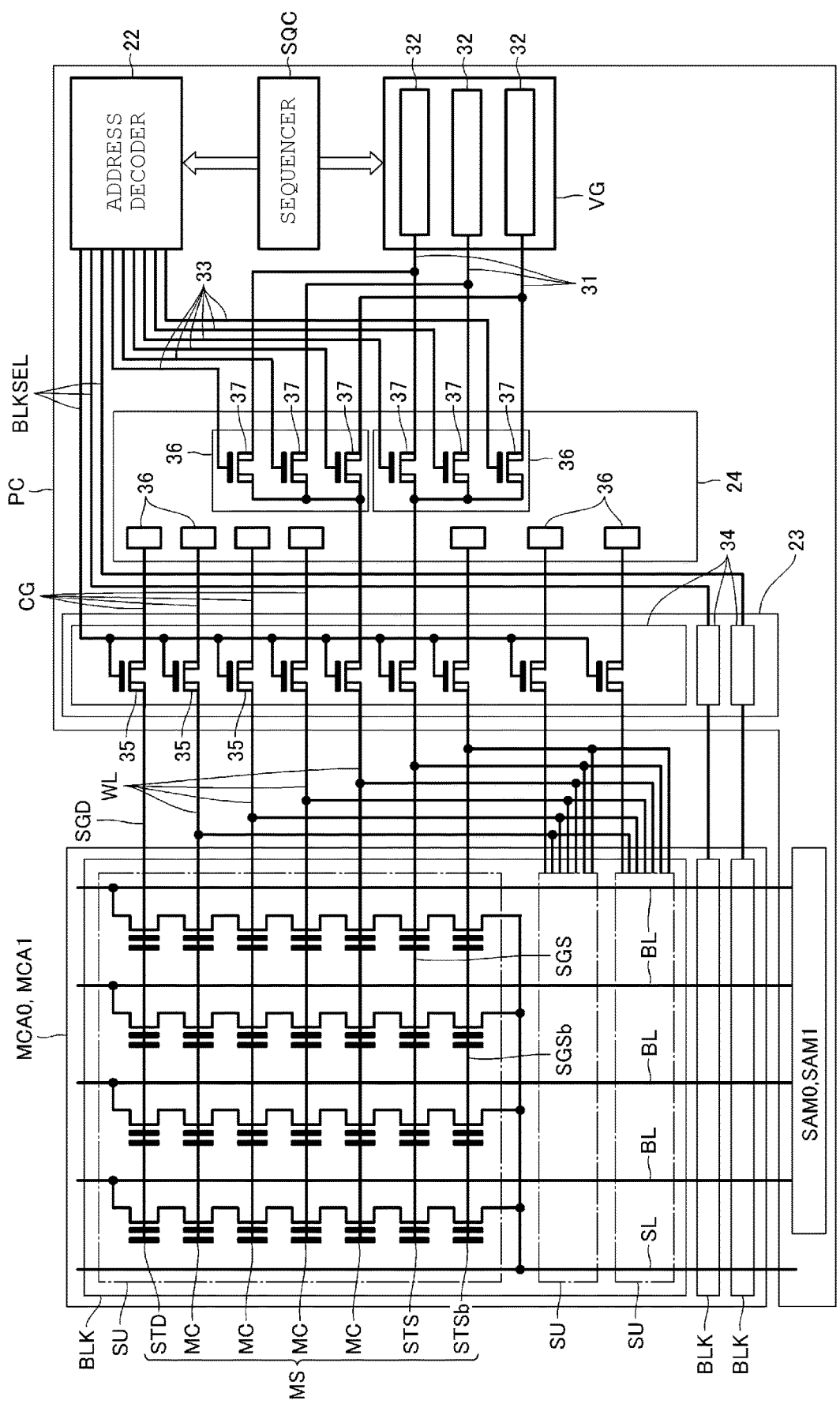
FIG. 5 is a schematic circuit diagram illustrating a configuration of a part of the memory die.
Figure 6:
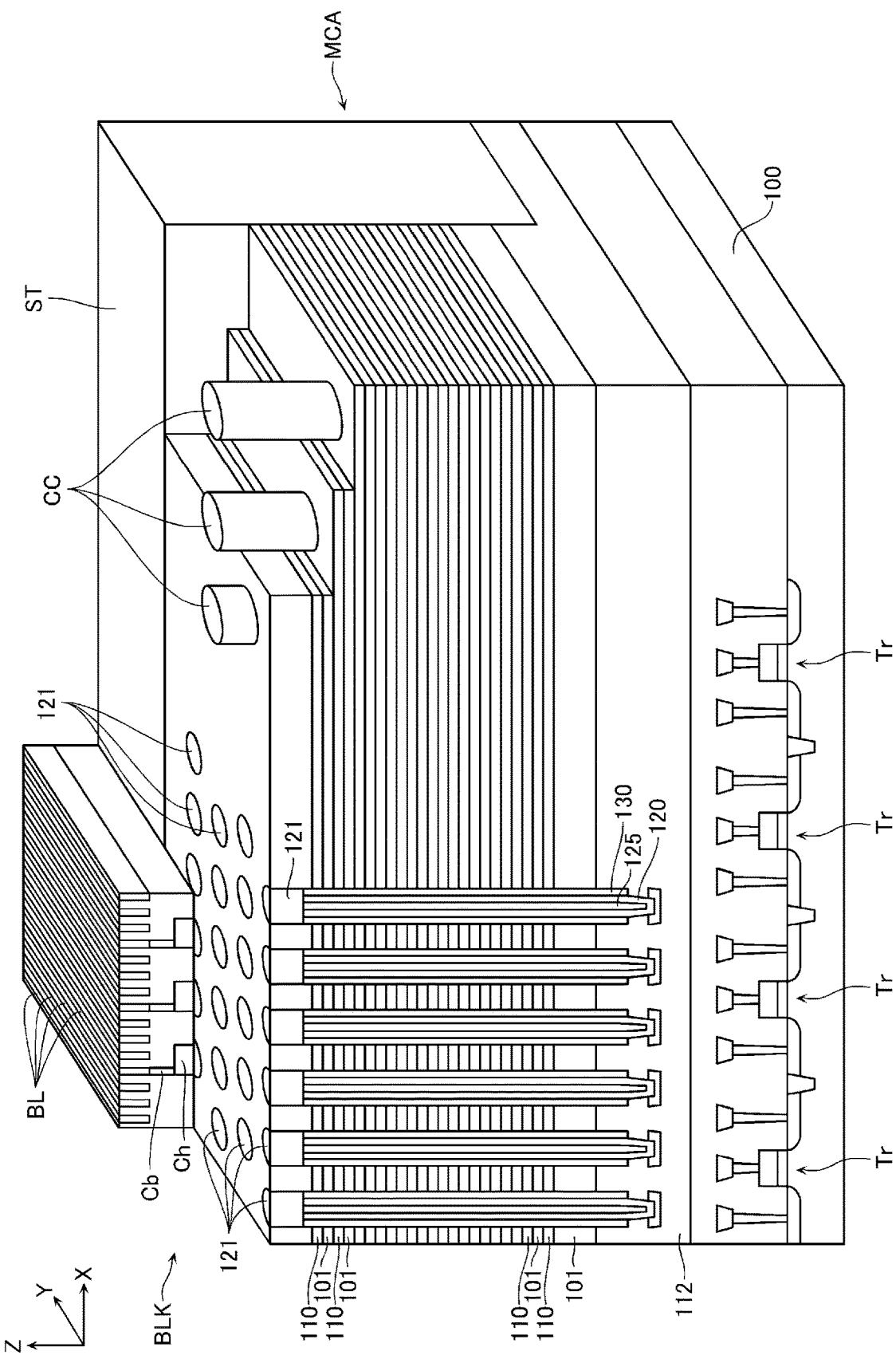
FIG. 6 is a schematic perspective view illustrating a configuration of a part of the memory die.
Figure 7:
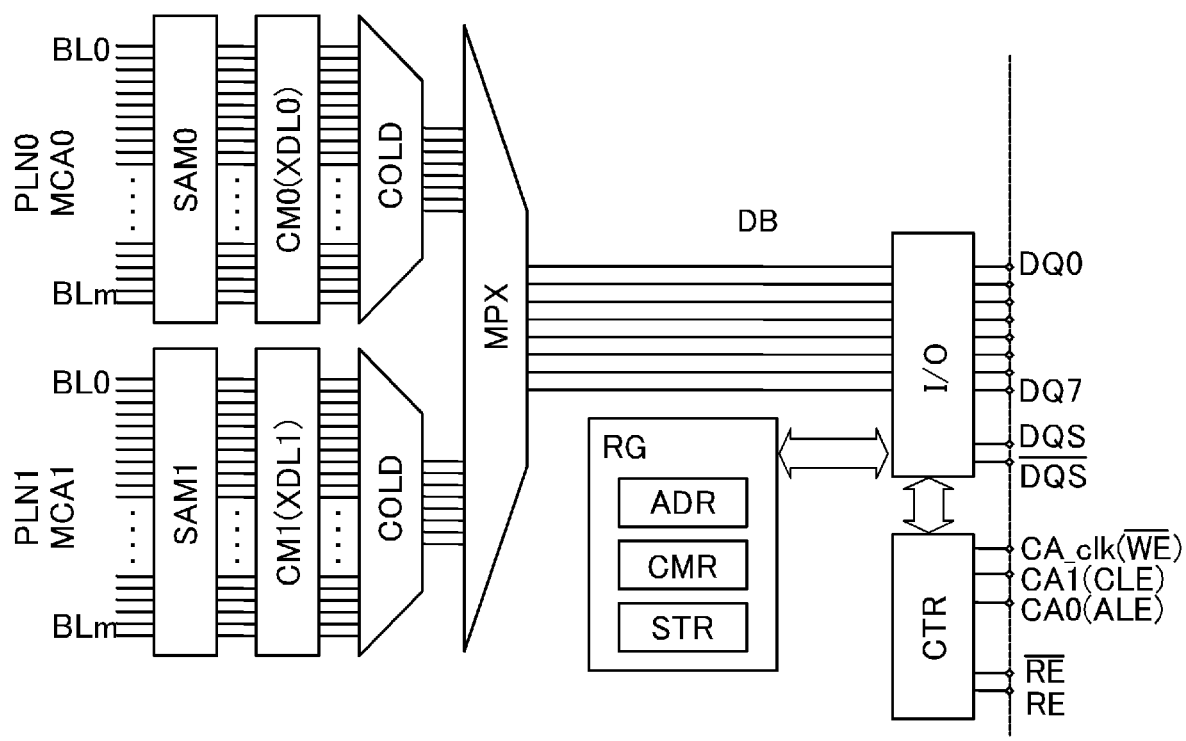
FIG. 7 is a schematic circuit diagram illustrating a configuration of a part of the memory die.

FIG. 4 is a schematic block diagram illustrating a configuration of the memory die MD according to the embodiment. FIG. 5 is a schematic circuit diagram illustrating a configuration of a part of the memory die MD. FIG. 6 is a schematic perspective view illustrating a configuration of a part of the memory die MD. FIGS. 7 and 8 are schematic circuit diagrams illustrating configurations of a part of the memory die MD. For convenience of description, some configurations are omitted in FIGS. 4 to 8.

FIG. 4 illustrates a plurality of control terminals and the like. These plurality of control terminals include a control terminal corresponding to a high active signal (positive logic signal), a control terminal corresponding to a low active signal (negative logic signal), and a control terminal corresponding to both of a high active signal and a low active signal. In FIG. 4, the symbols of the control terminals corresponding to the low active signal include overlines. In the present specification, the reference character/numeral for the control terminal corresponding to the low active signal may be indicated with a slash ("/"). The description in FIG. 4 is an example, and the specific embodiment can be adjusted as appropriate. For example, some or all of the high active signals can be made into low active signals, or some or all of the low active signals can be made into high active signals.

In FIG. 4, arrows indicating input/output directions are illustrated next to the plurality of control terminals. The control terminal indicated with arrows from left to right can be used for inputting data or other signals from the controller die CD to the memory die MD. The control terminal indicated with arrows from right to left can be used for outputting data or other signals from the memory die MD to the controller die CD. The control terminal indicated with arrows of both of the left and right direction can be used for both of the input of data or other signals from the controller die CD to the memory die MD and output of data or other signals from the memory die MD to the controller die CD.

As illustrated in FIG. 4, the memory die MD includes memory cell arrays MCA0 and MCA1 that store user data and a peripheral circuit PC connected to the memory cell arrays MCA0 and MCA1. In the following description, the memory cell arrays MCA0 and MCA1 may be collectively referred to as the memory cell arrays MCA. Also, the memory cell arrays MCA0 and MCA1 may be alternatively referred to as planes PLN0 and PLN1, respectively.

Configuration of Memory Cell Array MCA

As illustrated in FIG. 5, the memory cell array MCA includes a plurality of memory blocks BLK. These plurality of memory blocks BLK include a plurality of string units SU. These plurality of string units SU respectively include a plurality of memory strings MS. One ends of these plurality of memory strings MS are respectively connected to the peripheral circuit PC via bit lines BL. Also, the other ends of the plurality of memory strings MS are connected to the peripheral circuit PC via a common source line SL.

The memory string MS include a drain-side select transistors STD, a plurality of memory cells MC (memory cell transistors), source-side select transistors STS, and source-side select transistors STSb connected in series between the bit lines BL and the source line SL. Hereinafter, the drain-side select transistor STD, the source-side select transistor STS, and the source-side select transistor STSb may be simply referred to as the select transistors (STD, STS, and STSb).

The memory cell MC is a field effect transistor including a semiconductor layer, a gate insulating film, and a gate electrode. The semiconductor layer functions as a channel region. The gate insulating film includes a charge storage film. The threshold voltage of the memory cell MC changes according to the charge amount in the charge storage film. The memory cell MC stores user data of one bit or a plurality of bits. Word lines WL are respectively connected to the gate electrodes of the plurality of memory cells MC corresponding to one memory string MS. These word lines WL are respectively connected to all of the memory strings MS in one memory block BLK, commonly.

The select transistors (STD, STS, and STSb) each are a field effect transistor including a semiconductor layer, a gate insulating film, and a gate electrode. The semiconductor layer functions as a channel region. Select gate lines (SGD, SGS, and SGSb) are connected to the gate electrodes of the select transistors (STD, STS, and STSb), respectively. The drain-side select gate line SGD is provided for each string unit SU and is commonly connected to all of the memory strings MS in one string unit SU. The source-side select gate line SGS is commonly connected to all of the memory strings MS in the memory block BLK. The source-side select gate line SGSb is commonly connected to all of the memory strings MS in the memory block BLK.

For example, as illustrated in FIG. 6, the memory cell array MCA is provided on or over a semiconductor substrate 100. In the example of FIG. 6, a plurality of transistors Tr that configure the peripheral circuit PC are provided between the semiconductor substrate 100 and the memory cell array MCA.

The memory cell array MCA includes the plurality of memory blocks BLK arranged along the Y direction. Also, an inter-block insulating layer ST such as silicon oxide ($SiO_2$) is provided between two memory blocks BLK adjacent to each other in the Y direction.

For example, as illustrated in FIG. 6, the memory block BLK includes a plurality of conductive layers 110 arranged along the Z direction, a plurality of semiconductor pillars 120 extending in the Z direction to penetrate the plurality of conductive layers 110, and a plurality of gate insulating films 130 provided between the plurality of conductive layers 110 and the plurality of semiconductor pillars 120.

The conductive layer 110 is a substantially plate-shaped conductive layer extending in the X direction and the Y-direction. The conductive layer 110 may include a stacked film of a barrier conductive film such as titanium nitride (TiN) and a metal film such as tungsten (W). Also, the conductive layer 110 may include, for example, polycrystalline silicon including impurities such as phosphorus (P) or boron (B). A plurality of insulating layers 101 are arranged in the Z direction alternately with the plurality of conductive layers 110. Each insulating layer 101 is made of silicon oxide ($SiO_2$) or the like, and is provided between neighboring two of the plurality of conductive layers 110 in the Z direction.

Among the plurality of conductive layers 110, two or more conductive layers 110 positioned at the lowest two or more layers function as the source-side select gate lines SGS and SGSb (FIG. 5). The source-side select gate lines SGS and SGSb are connected to gate electrodes of the plurality of source-side select transistors STS and STSb. These plurality of conductive layers 110 functioning as the source-side select gate lines SGS and SGSb are electrically isolated between the memory blocks BLK.

The plurality of conductive layers 110 positioned above the source-side select gate lines SGS and SGSb function as the word lines WL (FIG. 5). The word lines WL are connected to gate electrodes of the plurality of memory cells MC (FIG. 5). These plurality of conductive layers 110 are electrically independent for each memory block BLK.

One or the plurality of conductive layers 110 positioned above the word lines WL function as the drain-side select gate line SGD. The drain-side select gate line SGD are connected to gate electrodes of the plurality of drain-side select transistors STD (FIG. 5). The widths of the plurality of conductive layers 110 functioning as the drain-side select gate line SGD in the Y direction are smaller than those of the other conductive layers 110 functioning as the word lines WL and as the source-side select gate lines SGS and SGSb.

A semiconductor layer 112 is provided under the conductive layers 110. The semiconductor layer 112 may include, for example, polycrystalline silicon including impurities such as phosphorus (P) or boron (B). Also, an insulating layer 101 such as silicon oxide ($SiO_2$) is provided between the semiconductor layer 112 and the conductive layers 110.

The semiconductor layer 112 functions as the source line SL (FIG. 5). The source line SL is commonly provided, for example, with respect to all of the memory blocks BLK provided in the memory cell array MCA.

For example, as illustrated in FIG. 6, the semiconductor pillars 120 are arranged in a predetermined pattern in the X direction and the Y direction. The semiconductor pillar 120 functions as a channel region of the plurality of memory cells MC and the select transistors (STD, STS, and STSb) provided in one memory string MS (FIG. 5). The semiconductor pillar 120 is, for example, a semiconductor layer such as polycrystalline silicon (Si). For example, as illustrated in FIG. 6, the semiconductor pillar 120 has a substantially bottomed cylindrical shape. An insulating layer 125 made of silicon oxide or the like is provided in the center portion of the semiconductor pillar 120. The outer peripheral surfaces of the semiconductor pillars 120 are respectively surrounded by the conductive layers 110. In other words, the semiconductor pillar 120 face the conductive layers 110 into which the semiconductor pillar 120 penetrates.

An impurity region 121 including N-type impurities such as phosphorus (P) is provided at the upper end portion of the semiconductor pillar 120. The impurity region 121 is connected to the bit line BL via a contact Ch and a contact Cb.

The gate insulating film 130 has a substantially bottomed cylindrical shape that covers the outer peripheral surface of the semiconductor pillar 120. The gate insulating film 130 includes, for example, a tunnel insulating film, a charge storage film, and a block insulating film stacked between the semiconductor pillar 120 and the conductive layer 110. The tunnel insulating film and the block insulating film are, for example, insulating films made of silicon oxide ($SiO_2$) or the like. The charge storage film is, for example, a film that can store charges, such as silicon nitride ($Si_3N_4$). The tunnel insulating film, the charge storage film, and the block insulating film have substantially cylindrical shapes and extend in the Z direction along the outer peripheral surface of the semiconductor pillar 120 except for a contact portion between the semiconductor pillar 120 and the semiconductor layer 112.

The gate insulating film 130 may be provided as a floating gate for each of the memory cells MC. In this case, the floating gate may be, for example, made of polycrystalline silicon or the like including N-type or P-type impurities.

A plurality of contacts CC are provided in the end portions of the plurality of conductive layers 110 in the X direction. The plurality of conductive layers 110 are connected to the peripheral circuit PC via these plurality of contacts CC. As illustrated in FIG. 6, these plurality of contacts CC extend in the Z direction and are connected to the conductive layer 110 at the lower end. The contacts CC may include, for example, a stacked film of a barrier conductive film such as titanium nitride (TiN) and a metal film such as tungsten (W).

Configuration of Peripheral Circuit PC

For example, as illustrated in FIG. 4, the peripheral circuit PC includes row decoders RD0 and RD1 respectively connected to the memory cell arrays MCA0 and MCA1 and sense amplifiers SA0 and SA1. The peripheral circuit PC further includes a voltage generation circuit VG, a sequencer SQC, an input/output control circuit I/O, a logic circuit CTR, an address register ADR, a command register CMR, a status register STR, and a data output timing adjustment unit TCT. In the following description, the row decoders RD0 and RD1 may be collectively referred to as row decoders RD, and the sense amplifiers SA0 and SA1 may be collectively referred to as sense amplifiers SA.

Configuration of Row Decoder RD

For example, as illustrated in FIG. 5, the row decoder RD (FIG. 4) includes an address decoder 22 that decodes address data Add (FIG. 4) and a block selection circuit 23 and a voltage selection circuit 24 that transfer operating voltages to the memory cell array MCA according to the output signal of the address decoder 22.

For example, as illustrated in FIG. 5, the address decoder 22 includes a plurality of block selection lines BLKSEL and a plurality of voltage selection lines 33. The address decoder 22 retrieves a row address RA from the address register ADR (FIG. 4) according to the control signal from the sequencer SQC, decodes the row address RA, causes a predetermined block select transistor 35 and a predetermined voltage select transistor 37 corresponding to the row address RA to be in an ON state, and causes the other block select transistors 35 and the other voltage select transistors 37 in an OFF state. For example, the voltages of the predetermined block selection line BLKSEL and the predetermined voltage selection line 33 are caused to enter an "H" state, and voltages of the others are caused to enter an "L" state. In a case where a P channel-type transistor not a N channel-type transistor is used, opposite voltages are applied to this wiring.

In the illustrated example, in the address decoder 22, one block selection line BLKSEL is provided for each one of the memory blocks BLK. However, this configuration can be appropriately changed. For example, one block selection line BLKSEL may be provided for each group of two or more memory blocks BLK.

For example, as illustrated in FIG. 5, the block selection circuit 23 includes a plurality of block selection units 34 corresponding to the memory blocks BLK. These plurality of block selection units 34 include the plurality of block select transistors 35 corresponding to the word lines WL and the select gate lines (SGD, SGS, and SGSb), respectively. The block select transistor 35 is, for example, a field effect-type high-breakdown voltage transistor. Drain electrodes of the block select transistors 35 are electrically connected to the corresponding word line WL or the select gate lines (SGD, SGS, and SGSb), respectively. Source electrodes are electrically connected to voltage supply lines 31 via wiring CG and the voltage selection circuit 24, respectively. The gate electrodes are commonly connected to the corresponding block selection line BLKSEL.

The block selection circuit 23 further includes a plurality of transistors (not illustrated). These plurality of transistors are field effect-type high-breakdown voltage transistors connected between the select gate lines (SGD, SGS, and SGSb) and a voltage supply line to which a ground voltage $V_{SS}$ is supplied. These plurality of transistors supply the ground voltage $V_{SS}$ to the select gate lines (SGD, SGS, and SGSb) for the unselected memory blocks BLK. The plurality of word lines WL provided in the unselected memory blocks BLK are left in floating states.

For example, as illustrated in FIG. 5, the voltage selection circuit 24 includes a plurality of voltage selection units 36 corresponding to the word line WL and the select gate lines (SGD, SGS, and SGSb). These plurality of voltage selection units 36 include the plurality of voltage select transistors 37, respectively. The voltage select transistors 37 are, for example, field effect-type high-breakdown voltage transistors. Drain terminals of the voltage select transistors 37 are electrically connected to the corresponding word line WL or the select gate lines (SGD, SGS, and SGSb) via the wiring CG and the block selection circuit 23. Source terminals are electrically connected to the corresponding voltage supply lines 31, respectively. The gate electrodes are connected to the corresponding voltage selection lines 33, respectively.

Configuration of Sense Amplifier SA

The sense amplifiers SA0 and SA1 (FIG. 4) include sense amplifier modules SAM0 and SAM1 and cache memories CM0 and CM1, respectively. The cache memories CM0 and CM1 include latch circuits XDL0 and XDL1, respectively.

In the following description, the sense amplifier modules SAM0 and SAM1 may be collectively referred to as the sense amplifier modules SAM, the cache memories CM0 and CM1 may be collectively referred to as the cache memories CM, and the latch circuits XDL0 and XDL1 may be collectively referred to as latch circuits XDL.

The sense amplifier module SAM includes, for example, sense circuits respectively corresponding to the plurality of bit lines BL, a plurality of latch circuits connected to the sense circuits, and the like.

The cache memory CM includes the plurality of latch circuits XDL. The plurality latch circuits XDL are connected to the latch circuits in the sense amplifier modules SAM. For example, user data Dat to be written into the memory cell MC and the user data Dat read from the memory cell MC are stored in the latch circuit XDL.

For example, as illustrated in FIG. 7, a column decoder COLD is connected to the cache memory CM. The column decoder COLD retrieves a column address CA from the address register ADR (FIG. 4) and selects the latch circuit XDL corresponding to the column address CA.

In a write operation, the user data Dat stored in these plurality of latch circuits XDL are transferred to the latch circuits in the sense amplifier modules SAM. Also, in a read operation, the user data Dat stored in the latch circuit in the sense amplifier module SAM are transferred to the latch circuit XDL. Also, in a data out operation, the user data Dat stored in the latch circuit XDL are transferred to the input/output control circuit I/O via the column decoder COLD and a multiplexer MPX.

Configuration of Voltage Generation Circuit VG

For example, as illustrated in FIG. 5, the voltage generation circuit VG (FIG. 4) is connected to the plurality of voltage supply lines 31. The voltage generation circuit VG includes, for example, a step-down circuit such as a regulator and a step-up circuit such as a charge pump circuit 32. These step-down circuit and step-up circuit are respectively connected to voltage supply lines to which a power supply voltage $V_{CC}$ and the ground voltage $V_{SS}$ (FIG. 4) are supplied, respectively. These voltage supply lines are connected to the pad electrode P described, for example, with reference to FIGS. 2 and 3. For example, a read operation, a write operation, and an erase operation on the memory cell array MCA according to the control signal from the sequencer SQC, the voltage generation circuit VG generates a plurality of operating voltages to be applied to the bit line BL, the source line SL, the word line WL, and the select gate lines (SGD, SGS, and SGSb) and simultaneously outputs the voltages to the plurality of voltage supply lines 31. The operating voltage output from the voltage supply line 31 is appropriately adjusted according to the control signal from the sequencer SQC.

Configuration of Sequencer SOC

The sequencer SQC (FIG. 4) outputs internal control signals to the row decoders RD0 and RD1, the sense amplifier modules SAM0 and SAM1, and the voltage generation circuit VG according to command data Cmd stored in the command register CMR. Also, the sequencer SQC outputs status data Stt indicating a state of the memory die MD appropriately to the status register STR. The state of the memory die MD includes a ready/busy state of the memory die MD. The ready/busy state may be simply referred to as a "ready/busy state".

Also, the sequencer SQC generates a ready/busy signal and outputs the ready/busy signal to the terminal RY/BY. The voltage level of the terminal RY/BY enters an "L" state, for example, during execution of an operation which involves supply of a voltage to the memory cell array MCA, such as a read operation, a write operation, and an erase operation, a get feature operation, a set feature operation, and the like to be described below and returns to an "H" state in the other cases. On the other hand, during an execution of an operation which does not involve supply of a voltage to the memory cell array MCA such as a data out operation, and a status read operation, the terminal RY/BY does not enter an "L" state. In a period when the terminal RY/BY is in an "L" state (busy period), an access to the memory die MD is basically prohibited. Also, in a period when the terminal RY/BY is in an "H" state (ready period), an access to the memory die MD is permitted. The terminal RY/BY is implemented by the pad electrode P described, for example, with reference to FIGS. 2 and 3.

For example, the pad electrodes P corresponding to the terminals RY/BY of the plurality of memory dies MD in the package PKG are commonly connected as illustrated in FIGS. 2A and 2B. When the pad electrodes P corresponding to the terminals RY/BY of the plurality of memory dies MD are commonly connected, if the terminal RY/BY of any one of the plurality of memory dies MD enters an "L" state, for example, the controller die CD is not possible to determine which memory die MD among the plurality of memory dies MD includes the terminal RY/BY that enters an "L" state. In other words, when the pad electrodes P corresponding to the terminals RY/BY of the plurality of memory dies MD are commonly connected as illustrated in FIGS. 2A and 2B, while it is possible to detect that the terminal RY/BY enters an "L" state in any one of the plurality of memory dies MD from the outside, it is not possible to detect which memory die MD includes the terminal RY/BY that enters the "L" state.

The sequencer SQC includes a feature register FR. The feature register FR is a register that stores feature data Fd. The feature data Fd includes, for example, a control parameter of the memory die MD.

Configuration of Address Register ADR

As illustrated in FIG. 4, the address register ADR is connected to the input/output control circuit I/O, and stores the address data Add that is input from the input/output control circuit I/O. The address register ADR includes, for example, a plurality of 8-bit register strings. The register string stores the address data Add corresponding to an internal operation, such as a read operation, a write operation, or an erase operation during the execution of it.

The address data Add includes, for example, the column address CA (FIG. 4) and the row address RA (FIG. 4). The row address RA includes, for example, a block address for specifying the memory block BLK (FIG. 5), a page address for specifying the string unit SU and the word line WL, a plane address for specifying the memory cell array MCA (plane), and a chip address for specifying the memory die MD among the plurality of commonly-connected memory dies MD.

Configuration of Command Register CMR

The command register CMR is connected to the input/output control circuit I/O and stores the command data Cmd that is input from the input/output control circuit I/O. The command register CMR includes, for example, at least one set of 8-bit register strings. When the command data Cmd is stored in the command register CMR, the control signal is transmitted to the sequencer SQC.

Configuration of Status Register STR

The status register STR is connected to the input/output control circuit I/O, and stores the status data Stt to be output to the input/output control circuit I/O. The status register STR includes, for example, a plurality of 8-bit register strings. For example, when an internal operation such as a read operation, a write operation, or an erase operation is executed, the register string of the status register STR stores the status data Stt related to the internal operation being executed. The status data Stt includes ready/busy information indicating the ready/busy state of the memory cell array MCA. For example, the status data Stt includes information of more than 2 bits, and the ready/busy information is information of 1 bit.

Configuration of Data Output Timing Adjustment Unit TCT

The data output timing adjustment unit TCT is connected to bus wiring DB between the cache memories CM0 and CM1 and the input/output control circuit I/O. For example, it is assumed that the data out operation from the cache memory CM0 and the data out operation from the cache memory CM are successively executed, the data output timing adjustment unit TCT adjusts a start timing of the data out operation from the cache memory CM1 so that it is started just after completion of the data out operation from the cache memory CM0 without a delay.

Configuration of Input/Output Control Circuit I/O

The input/output control circuit I/O (FIG. 4) includes the data signal input/output terminals DQ0 to DQ7, the data strobe signal input/output terminals DQS and/DQS, a shift register (not shown), a buffer circuit (not shown), and a connection change circuit SW.

Each of the data signal input/output terminals DQ0 to DQ7 and the data strobe signal input/output terminals DQS and/DQS are implemented by the pad electrodes P described with reference to FIGS. 2 and 3. The data input via the data signal input/output terminals DQ0 to DQ7 is input from the buffer circuit to the cache memory CM. Also, the data output via the data signal input/output terminals DQ0 to DQ7 is input from the cache memory CM to the buffer circuit according to the internal control signal from the logic circuit CTR.

The signal input via the data strobe signal input/output terminals DQS and/DQS (for example, the data strobe signal and a complementary signal thereof) is used for the input of data via the data signal input/output terminals DQ0 to DQ7. The data input via the data signal input/output terminals DQ0 to DQ7 is received into the shift register in the input/output control circuit I/O at timings of a rising edge of the voltage of the data strobe signal input/output terminal DQS and a falling edge of the voltage of the data strobe signal input/output terminal/DQS and at timings of a falling edge of the voltage of the data strobe signal input/output terminal DQS and a rising edge of the voltage of the data strobe signal input/output terminal/DQS.

For example, as illustrated in FIG. 8, each of the data signal input/output terminals DQ0 to DQ7 and the data strobe signal input/output terminals DQS and/DQS is connected to an input circuit 201 and an output circuit 202. The input circuit 201 is, for example, a receiver such as a comparator. The output circuit 202 is, for example, a driver such as an off chip driver (OCD) circuit.

The connection change circuit SW (FIG. 4) is a circuit that changes an order of data input from the outside of the memory die MD to the data signal input/output terminals DQ0 to DQ7.

Each of the memory dies MD determines whether each of the memory dies MD is provided in the forward connection package PKGa or in the reverse connection package PKGb, for example, based on the feature data Fd stored in the feature register FR.

Configuration of Logic Circuit CTR

The logic circuit CTR (FIG. 4) includes the plurality of control terminals/CE, CA1 (CLE), CA0 (ALE), CA_clk (/WE), /RE, RE, and/WP, and a logic circuit connected to these plurality of control terminals/CE, CA1 (CLE), CA0 (ALE), CA_clk (/WE), /RE, RE, and/WP. The logic circuit CTR receives external control signals from the controller die CD via the control terminals/CE, CA1 (CLE), CA0 (ALE), CA_clk (/WE), /RE, RE, and/WP and outputs the internal control signals to the input/output control circuit I/O according to the external control signals.

For example, as illustrated in FIG. 8, each of the control terminals/CE, CA1 (CLE), CA0 (ALE), CA_clk (/WE), /RE, RE, and/WP is connected to the input circuit 201. Also, each of the control terminals CA1 (CLE), CA0 (ALE), and/WP is connected to also the output circuit 202, in addition to the input circuit 201. Each of the control terminals/CE, CA1 (CLE), CA0 (ALE), CA_clk (/WE), /RE, RE, and/WP is implemented by the pad electrode P described, for example, with reference to FIGS. 2 and 3.

The signal input via the control terminal/CE (for example, a chip enable signal) is used to select the memory die MD. The memory die MD in which "L" is input to the control terminal/CE enters a state in which the user data Dat, the command data Cmd, the address data Add, and the status data Stt (hereinafter, simply referred to as "data" in some cases) can be input or output. The memory die MD in which "H" is input to the control terminal/CE enters a state in which data cannot be input or output. As illustrated in FIG. 8, the control terminal/CE is connected to the input circuit 201.

The types of signals input via the control terminal CA1 (CLE) may be different, and the types of signals input via the control terminal CA0 (ALE) may be different. For example, the signal input via the control terminal CA1 (CLE) and the signals input via the control terminals CA0 (ALE) may be used to control connection between the control terminals CA1 (CLE) and CA0 (ALE) with the command register CMR and the address register AMR, and are received as the command data Cmd and the address data Add. Further, the status data Stt may be output from the status register STR via the control terminals CA1 (CLE) and CA0 (ALE). Still further, the feature data Fd may be input to or output from the feature register FR via the control terminals CA1 (CLE) and CA0 (ALE). According to the present embodiment, when the memory die MD operates in the normal mode, signals including two or more sets of data input in a time-division manner via the control terminal CA1 (CLE) and the control terminal CA0 (ALE) are used for a ready/busy output start instruction for instructing output of a ready/busy state of the memory die MD. The two or more sets of data input in a time-division manner are acquired by signals input via the control terminal CA1 (CLE) and the control terminal CA0 (ALE) at timings of a rising edge (for example, switching from the "L" state to the "H" state) of the voltage of the signal input to the control terminal CA0 (ALE) and a falling edge (for example, switching from the "H" state to the "L" state) of the voltage of the signal input to the control terminal CA0 (ALE) described below. Also, when the memory die MD operates in the ready/busy output mode, the information (ready/busy information) indicating the ready/busy state of the memory die MD via the control terminal CA1 (CLE) is output as the ready/busy information. The information (ready/busy information) indicating the ready/busy state of the memory die MD is substantially the same, for example, as a part of the information output from the sequencer SQC to the terminal RY/BY illustrated in FIG. 4. The output of the information (ready/busy information) indicating the ready/busy state of the memory die MD or the output information itself may be referred to as "R/B output". The functions and the like of the control terminal CA1 (CLE) are described below.

The signal (for example, a write enable signal) input via the control terminal CA_clk (/WE) is used at the time of inputting data from the controller die CD to the memory die MD. The function of the control terminal CA_clk (/WE) and the like are described below.

Signals (for example, read enable signal and a complementary signal thereof) input from the controller die CD to the control terminals/RE and RE of the memory die MD are signals for controlling timing of outputting data from the data signal input/output terminals DQ0 to DQ7 of the memory die MD. The data output from the data signal input/output terminals DQ0 to DQ7 is switched in response to a falling edge of the voltage of the control terminal/RE and a rising edge of the voltage of the control terminal RE and in response to a rising edge of the voltage of the control terminal/RE and a falling edge of the voltage of the control terminal RE.

While the signal (for example, a write protect signal) input via the control terminal/WP is used to limit input of the user data Dat from the controller die CD to the memory dies MD, it may be used instead of one of the signals input from the control terminals CA0 (ALE) and CA0 (ALE) or in addition to the signals input from the control terminals CA0 (ALE) and CA0 (ALE). In this case, the signal input via the control terminal/WP may be used as the command data Cmd, the address data Add and the feature data Fd. Similarly, the signal output via the control terminal/WP may be used instead of one of the signals output from the control terminals CA0 (ALE) and CA0 (ALE) or in addition to the signals output from the control terminals CA0 (ALE) and CA0 (ALE). In this case, the status data Stt from the status register STR and the feature data Fd from the feature register FR may be output via the control terminal/WP.

Way of Inputting Signal from Controller Die CD to Memory Die MD

Signals exchanged between the controller die CD and the memory die MD in the present embodiment are described with reference to FIGS. 9 to 17.

Role of Each Terminal

Figure 9:
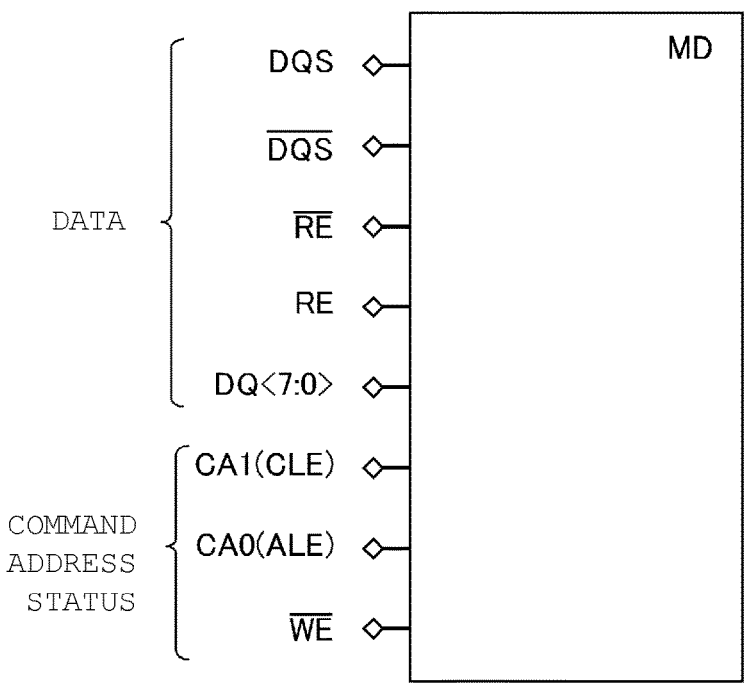
FIG. 9 is a schematic diagram illustrating a way of inputting a signal from a controller die to the memory die according to the embodiment.

FIG. 9 is a schematic diagram illustrating a role of a signal input/output terminal and a control terminal in the memory die MD. In the following description, the data signal input/output terminals DQ0 to DQ7 are denoted as the data signal input/output terminal DQ<7:0>.

For example, as illustrated in FIG. 9, in the normal mode, the memory die MD according to the present embodiment uses the data signal input/output terminal DQ<7:0> for inputting and outputting the user data Dat. Meanwhile, the memory die MD according to the present embodiment does not use the data signal input/output terminal DQ<7:0> for inputting the command data Cmd and the address data Add and outputting the status data Stt. Also, in the normal mode, the memory dies MD according to the present embodiment uses the control terminals CA1 (CLE) and CA0 (ALE) for inputting the command data Cmd and the address data Add and outputting data such as the status data Stt. In the ready/busy output mode described below, the memory die MD according to the present embodiment may use the control terminals CA1 (CLE) and CA0 (ALE) for output of the ready/busy state of the memory die MD, in addition to the input of the command data Cmd and the address data Add and output of data such as the status data Stt.

Some signals input or output via the control terminals CA1 (CLE) and CA0 (ALE) of the memory dies MD according to the present embodiment may be referred to as a header set. The header set includes 4-bits signals that are divided into two cycles and input in a time-division manner when the memory die MD operates in a normal mode.

Also, the command data Cmd, the address data Add, the status data Stt, and the feature data Fd that are input or output subsequent to the header set may be referred to as a body set. The body set includes 8-bit data that is divided into four cycles and input in a time-division manner when the memory die MD operates in a normal mode.

Also, a combination of one header set and one body set may be referred to as a frame.

The memory die MD according to the present embodiment outputs the ready/busy information to the controller die CD via one of the control terminals CA1 (CLE) and CA0 (ALE) in the ready/busy output mode. Some signals input or output via the other of the control terminals CA1 (CLE) and CA0 (ALE) of the memory die MD when the memory die MD operates in the ready/busy output mode may be referred to as a header set. The header set includes 4-bit signals that are divided into four cycles and input in a time-division manner when the memory die MD operates in the ready/busy output mode.

Also, when the memory die MD operates in the ready/busy output mode, the command data Cmd, the address data Add, the status data Stt, and the feature data Fd input or output subsequent to the header set may be referred to as a body set. The body set includes 8-bit data that is divided into eight cycles and input in a time-division manner when the memory die MD operates in a ready/busy output mode.

When the memory die MD operates in the ready/busy output mode, a combination of one header set and one body set may be referred to as a frame.

In the normal mode, the data of the control terminals CA1 (CLE) and CA0 (ALE) is received into a register (not illustrated) of the logic circuit CTR at timings of the rising edge and the falling edge of the signal input to the control terminal CA_clk (/WE). That is, the data of the control terminals CA1 (CLE) and CA0 (ALE) is received into the register (not illustrated) of the logic circuit CTR while toggling the signal input to the control terminal CA_clk (/WE). According to the present specification, 2-bit or 1-bit data input or output via at least one of the control terminals CA1 (CLE) and CA0 (ALE) in response to the rising edge and the falling edge of the signal input to the control terminal CA_clk (/WE) is set as one cycle. For example, when the signal input to the control terminal CA_clk (/WE) once rises and then falls, 4-bit or 2-bit data is input or output via at least one of the control terminals CA1 (CLE) and CA0 (ALE) in response thereto. In other words, a combination of the rising edge and the falling edge of the signal input to the control terminal CA_clk (/WE) correspond to two cycles.

Example of Header Set Input in Normal Mode

Figure 10:
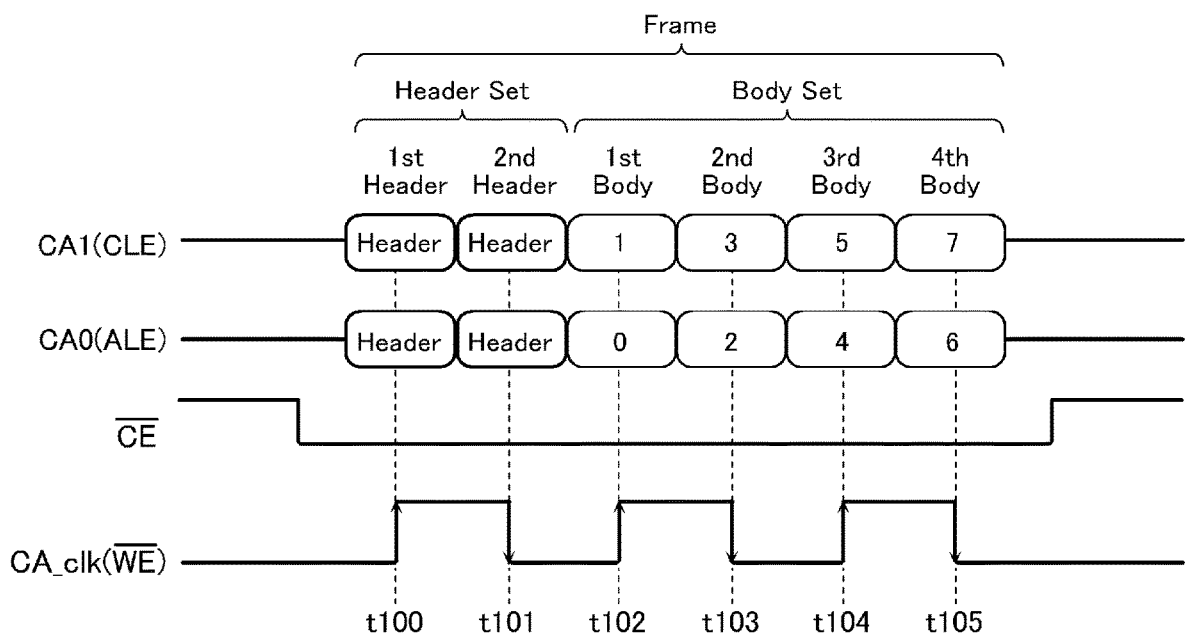
FIG. 10 is a schematic waveform diagram illustrating signals input from the controller die to the memory die.

FIG. 10 is a schematic waveform diagram illustrating signals input from the controller die to the memory die MD according to the embodiment. FIG. 11 is a schematic table showing exemplary definitions for a header set.

FIG. 10 illustrates a waveform when the memory die MD operates in a normal mode. In the example of FIG. 10, it is assumed that a signal in an "L" state has been previously input to the control terminal /CE. Then, the signal in the "L" state and the signal in the "H" state are input to the control terminal CA_clk (/WE) at a substantially constant frequency. That is, in a state in which the input signal of the control terminal /CE is in "L" state, switching of the signal input to the control terminal CA_clk (/WE) to rise from "L" to "H" and fall from "L" to "H" (two times of toggling) is repeated.

In the example of FIG. 10, at a timing t100 and a timing t101, a 4-bit header set is input through the control terminals CA1 (CLE) and CA0 (ALE) with the rising edge and the falling edge of the signal input to the control terminal CA_clk (/WE). More specifically, at the timing t100 and the timing t101, the controller die CD divides the 4-bit header set illustrated in FIG. 11 into two cycles and inputs the 4-bit header set to the memory die MD two bits for each cycle. For example, when it is instructed to input the 8-bit command data Cmd to the body set, the header set including the first cycle of bits of "0" and "0" and the second cycle of bits "1" and "1" are received into the register (not illustrated) of the logic circuit CTR. Bits of "0" and "0" of the first cycle are received into the register (not illustrated) of the logic circuit CTR at the timing when the signal input to the control terminal CA_clk (/WE) rises from "L" to "H" (rising edge) in a state in which the voltages of the control terminals CA1 (CLE) and CA0 (ALE) is set to correspond to bits of "0" and "0". Similarly, bits of "1" and "1" of the second cycle are received into the register (not illustrated) of the logic circuit CTR at a timing when the signal input to the control terminal CA_clk (/WE) falls from "H" to "L" (falling edge) in a state in which the voltages of the control terminals CA1 (CLE) and CA0 (ALE) are set to correspond to the bits of "1" and "1".

Also, in the example of FIG. 10, at timings t102 to t105, an 8-bit body set is input through the control terminal CA0 (ALE) with the rising edge and the falling edge of the signal input to the control terminal CA_clk (/WE). More specifically, at the timings t102 to t105, the controller die CD divides the 8-bit body set into four cycles in accordance with the 4-bit header set (entry condition) and inputs the 8-bit body set to the memory die MD by two bits for each cycle. For example, the 8-bit command data Cmd includes Bit 0 to Bit 7. First, two bits of the first cycle of the body set are received into the command register CMR at the timing when the signal input to the control terminal CA_clk (/WE) falls from "H" to "L" (falling edge) in a state in which the voltages of the control terminals CA1 (CLE) and CA0 (ALE) are set to correspond to Bit 1 and Bit 0. Two bits of the second cycle of the body set are received at the timing when the signal input to the control terminal CA_clk (/WE) falls from "H" to "L" (falling edge) in a state in which the voltages of the control terminals CA1 (CLE) and CA0 (ALE) are set to correspond to Bit 3 and Bit 2. Similarly, two bits of the third cycle and two bits of the fourth cycle are received at timings at each of the rising edge and the falling edge of the signal input to the control terminal CA_clk (/WE) in states in which voltages of the control terminals CA1 (CLE) and CA0 (ALE) set to correspond to Bit 5 and Bit 4 and to Bit 7 and Bit 6, respectively.

The header set for instructing to input the command data Cmd in the body set (CMD) is described as an example, the embodiment is not limited thereto. A header set for instructing to input the address data Add in the body set as illustrated in FIG. 11 (ADD) can be similarly used. Also, a header set for instructing to output of data (DOUT) in the body set, a header set for instructing input data (DIN), and a header set for instructing to start output of the ready/busy state in the body set (R/B output) may also be used. Examples of the output of data (DOUT) include output of the status data Stt or the feature data Fd. Examples of the input of data (DIN) include input of the feature data Fd. The Header Rising Edge illustrated in FIG. 11 shows two bits of the first cycle which are input in accordance with the rising edge of the signal input to the control terminal CA_clk (/WE). Also, the Header Falling Edge show two bits of the second cycle which are input in accordance with the falling edge of the signal input to the control terminal CA_clk (/WE).

Operation

Next, the operation of the memory die MD is described.

The memory die MD is configured to execute the read operation. The read operation is an operation of reading the user data Dat from the memory cell array MCA by the sense amplifier module SAM and transferring the read user data Dat to the latch circuit XDL. In the read operation, the user data Dat that is read from the memory cell array MCA is transferred to the latch circuit XDL via the bit line BL and the sense amplifier module SAM.

Also, the memory die MD is configured to execute the data out operation. The data out operation is an operation of outputting the user data Dat provided in the latch circuit XDL to the controller die CD. In the data out operation, the user data Dat provided in the latch circuit XDL are output to the controller die CD via the column decoder COLD, the multiplexer MPX, the bus wiring DB, and the input/output control circuit I/O described with reference to FIG. 7.

Also, the memory die MD is configured to execute the status read operation. The status read operation is an operation of outputting the status data Stt provided in the status register STR of the memory die MD to the controller die CD. In the status read operation, the status data Stt provided in the status register STR is output to the controller die CD via the logic circuit CTR.

Also, the memory die MD is configured to execute the get feature operation. The get feature operation is an operation of outputting the feature data Fd provided in the feature register FR (FIG. 4) to the controller die CD (FIG. 1). In the get feature operation, the feature data Fd provided in the feature register FR of the memory die MD is output to the controller die CD via the logic circuit CTR.

Also, the memory die MD is configured to execute the set feature operation. The set feature operation is an operation of inputting the feature data Fd to the feature register FR of the memory die MD (FIG. 4). In the set feature operation, the feature data Fd is input from the controller die CD to the feature register FR of the memory die MD via the logic circuit CTR.

Also, the memory die MD is configured to operate in the ready/busy output mode according to the ready/busy output mode start instruction. When the memory die MD operates in the ready/busy output mode, the ready/busy state of the memory dies MD is output to the controller die CD via the control terminal CA1 (CLE) or the like of the logic circuit CTR.

Set Feature Operation in Normal Mode

Figure 12:
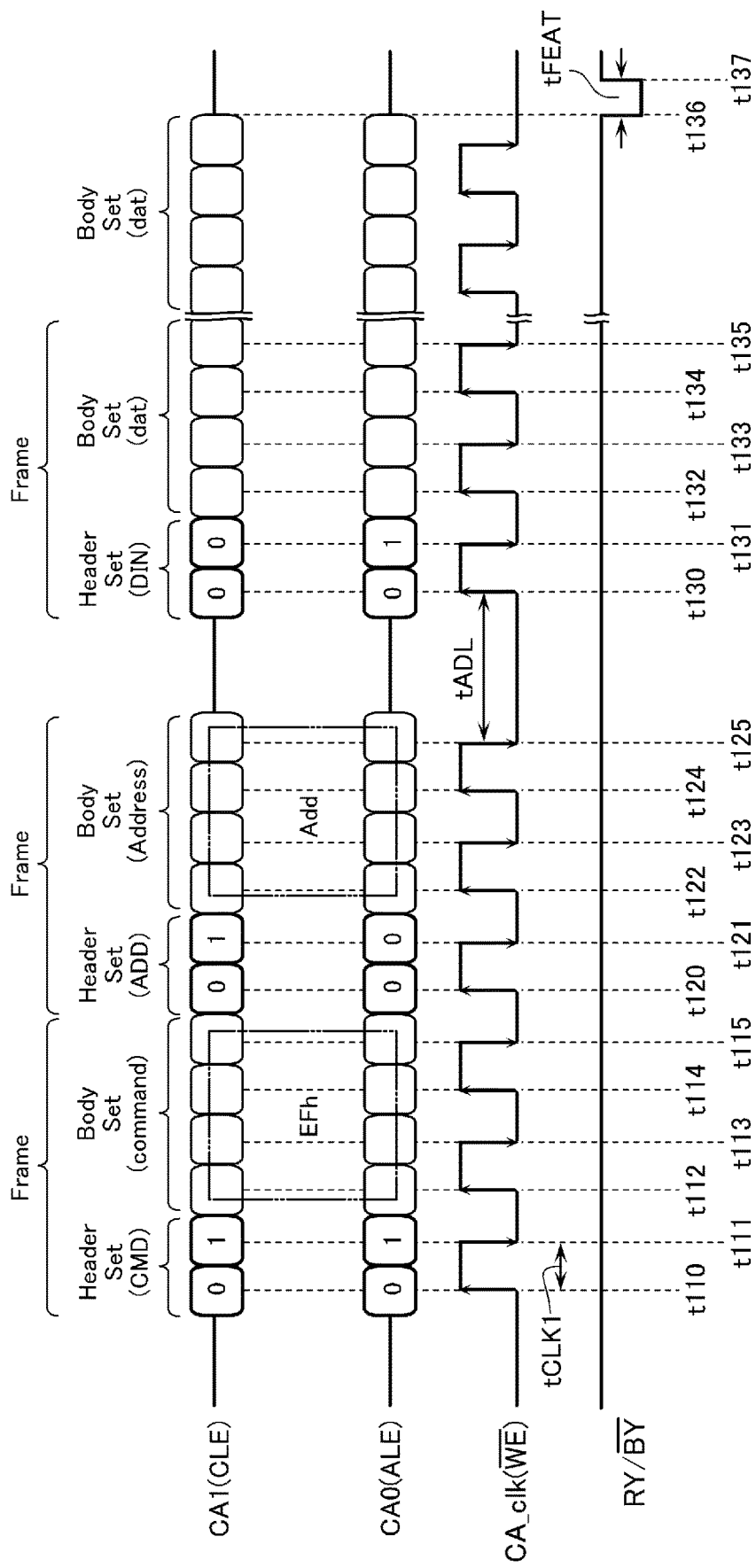
FIGS. 12-26 are schematic waveform diagrams illustrating signals exchanged between the controller die and the memory die during operation of the memory system.
Figure 13:
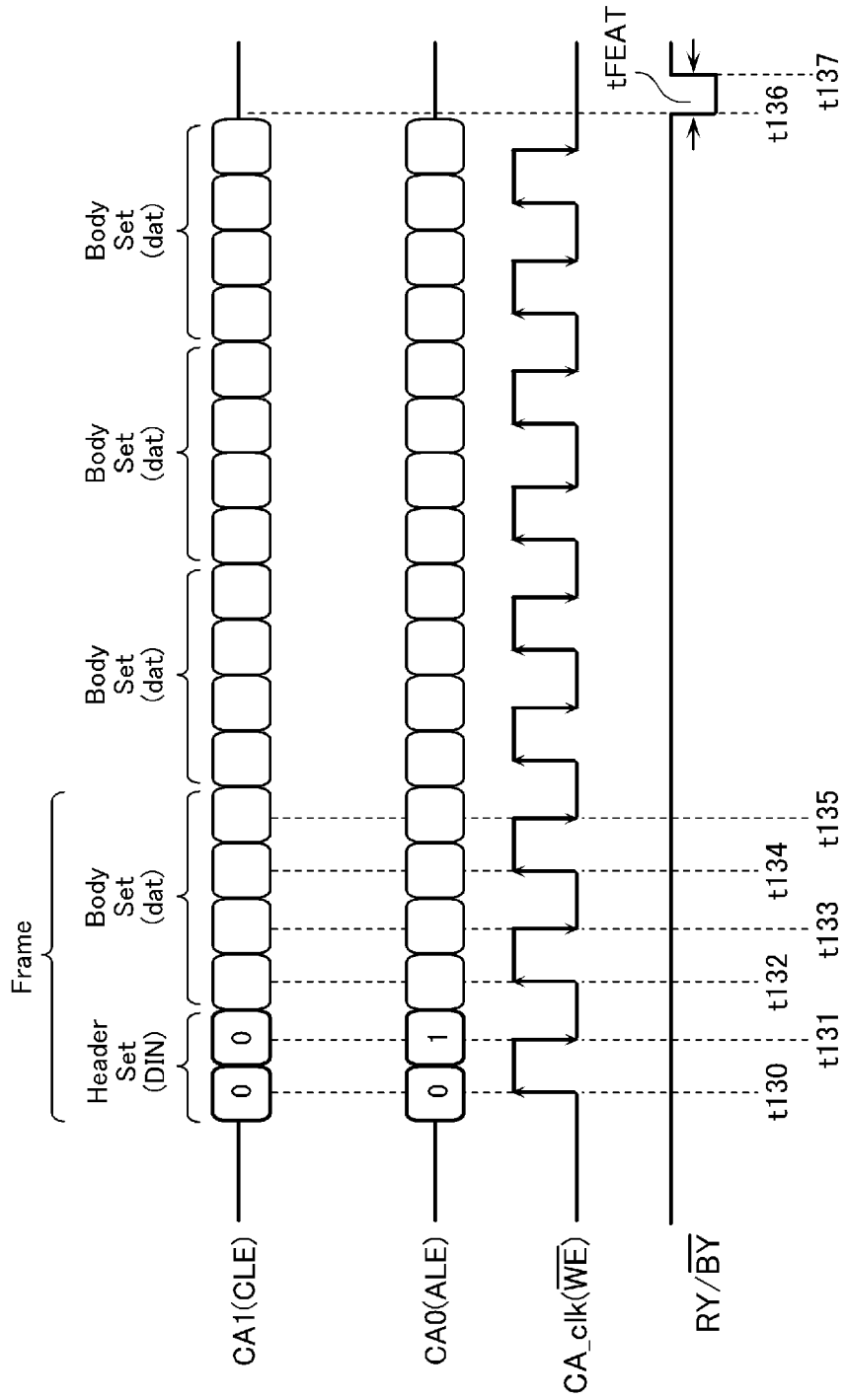
Figure 14:
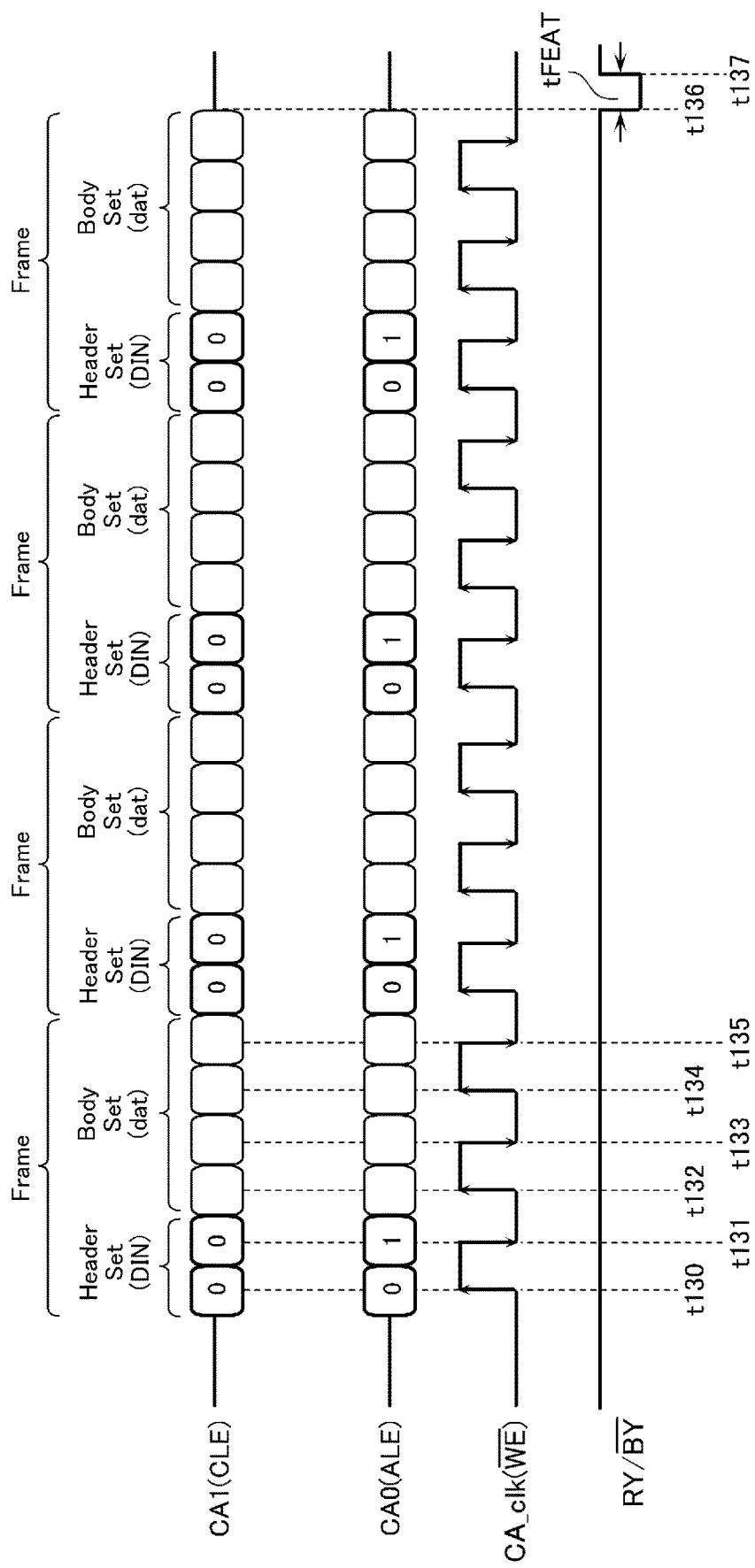

FIGS. 12 to 14 are schematic waveform diagrams illustrating signals exchanged between the controller die CD and the memory die MD. FIG. 12 illustrates a schematic timing chart when the memory die MD operates in the normal mode and executes the set feature operation. FIG. 13 illustrates an example of a waveform corresponding to an end part of the waveform illustrated in FIG. 12. FIG. 14 illustrates another example of a waveform corresponding to an end part of the waveform illustrated in FIG. 12.

Though not illustrated, it is assumed that the voltage of the control terminal/CE has previously fallen from "H" to "L" before a timing t110 of FIG. 12.

Subsequently, at timings t110 to t135, the controller die CD inputs the command set of the set feature operation to the memory die MD. That is, the controller die CD inputs a frame of the command data Cmd for instructing the set feature operation at the timings t110 to t115 to the memory die MD, inputs a frame of the address data Add for designating the feature address (for example, a part of the feature register FR) corresponding to a parameter to be a target of the set feature operation at the timings t120 to t125 to the memory die MD, and inputs one or more frames of the feature data Fd for setting the feature address at timings t130 to t135 to the memory die MD.

More specifically, at the timings t110 to t11, the controller die CD inputs a header set includes the first cycle indicating bits of "0" and "0" and the second cycle indicating bits of "1" and "1" to the memory dies MD via the control terminals CA1 (CLE) and CA0 (ALE). As illustrated in FIG. 11, this header set is a header set for instructing an input of the command data Cmd. The first cycle of the header set is input at the rising edge (toggling) of the signal input to the control terminal CA_clk (/WE), and the second cycle of the header set is input at the falling edge (toggling) of the signal input to the control terminal CA_clk (/WE). In other words, at the timings t110 to t111, of a frame corresponding to command data Cdd as a part of the command set, the header set (4-bit information) is input to the memory die MD while toggling the signal input to the control terminal CA_clk (/WE) two times.

Also, at timings t112 to t115, the controller die CD inputs command data EFh to the memory die MD as the body set, via the control terminals CA1 (CLE) and CA0 (ALE). The command data of "EFh" is the command data Cmd for instructing the set feature operation. For example, when the command data EFh is input, in all the memory dies MD in which "L" is input to the control terminal/CE, the set feature operation is executed. While the command data of "EFh" is described as an example, other kinds of command data such as "D5h" for instructing the set feature operation to one of the memory dies MD may be similarly input. In other words, at the timings t112 to t115, of the frame corresponding to the command data Cdd as a part of the command set of the set feature operation, the body set (8-bit information) is input to the memory die MD while toggling the signal input to the control terminal CA_clk (/WE) four times. For example, an interval between timings of the rising edge and the falling edge of the signal input to the control terminal CA_clk (/WE) and an interval between timings of the falling edge and the rising edge of the signals input to the control terminal CA_clk (/WE) are periods tCLK1. That is, the toggle interval of the control terminal CA_clk (/WE) is the period tCLK1.

Also, at timings t120 to t121, the controller die CD inputs the header set including the first cycle indicating bits of "0" and "0" and the second cycle indicating bits of "1" and "0" to the memory die MD via the control terminals CA1 (CLE) and CA0 (ALE). As illustrated in FIG. 11, this header set is a header set for instructing to input the address data Add. The header set is input at the rising edge and the falling edge of the signal input to the control terminal CA_clk (/WE). In other words, at the timings t120 to t121, of the frame corresponding to the address data Add as a part of the command set of the set feature operation, the header set (4-bit information) is input to the memory die MD while toggling the signal input to the control terminal CA_clk (/WE) two times.

Also, at timings t122 to t125, the controller die CD inputs the address data Add as the body set to the memory die MD via the control terminals CA1 (CLE) and CA0 (ALE). This address data Add is data for specifying a part for inputting the feature data Fd in the feature register FR (a parameter set in the set feature operation or the like). In other words, at the timings t122 to t125, of the frame corresponding to the address data Add as a part of the command set of the set feature operation, the body set (8-bit information) is input to the memory die MD while toggling the signal input to the control terminal CA_clk (/WE) four times.

Also, at timings t130 to t131, the controller die CD inputs a header set including the first cycle indicating bits of "0" and "0" and the second cycle indicating bits of "0" and "1" to the memory die MD via the control terminals CA1 (CLE) and CA0 (ALE). As illustrated in FIG. 11, this header set is a header set for instructing to input data. The header set is input at the rising edge and the falling edge of the signal input to the control terminal CA_clk (/WE). In other words, at the timings t130 to t131, of the frame corresponding to the feature data Fd as a part of the command set of the set feature, the header set (4-bit information) is input to the memory die MD while toggling the signal input to the control terminal CA_clk (/WE) two times.

The controller die CD maintains the signal input to the control terminal CA_clk (/WE) to "L" during the period tADL from the timing t125 to the timing t130. In other words, after inputting the frame corresponding to the address data Add, the controller die CD defers an input of the frame corresponding to the feature data Fd to the memory die MD for at least a period tADL. In the meantime, the signal input to the control terminal CA_clk (/WE) is not toggled. For example, the period tADL is set for securing time for the memory die MD to prepare for an input of the feature data Fd to the designated part in the feature register FR, after the command data Cmd and the address data Add are input to the memory die MD.

Also, at timings t132 to t135, the controller die CD inputs the feature data Fd as the data to the memory die MD. This feature data Fd includes information indicating an operation parameter or the like. In the illustrated example, at the timings t132 to t135, the data of eight bits are input four times as the feature data Fd, but the number of times for which the data of eight bits are input may be less than or more than four.

The feature data Fd may be input such that the header set that instructs to input data is input once, and then the plurality of body sets correspond to respective parts of the feature data Fd may be successively input, as illustrated in FIG. 13. In this case, until the input of the feature data Fd is completed, the input of the header set may be omitted. Also, the feature data Fd may be input such that a frame including both of the header set for instructing to input data and the body set corresponding to a part of the feature data Fd may be input a plurality of times, as illustrated in FIG. 14.

Also, after a timing t136, the set feature operation is started, and the voltage of the terminal RY/BY of the memory die MD falls from "H" to "L".

Also, at a timing t137, the set feature operation is completed, and the voltage of the terminal RY/BY rises from "L" to "H". During a period tFEAT when the voltage of the terminal RY/BY falls once and then falls once again, the set feature operation of inputting the feature data Fd to the designated part in the feature register FR is executed.

Get Feature Operation in Normal Mode

Figure 15:
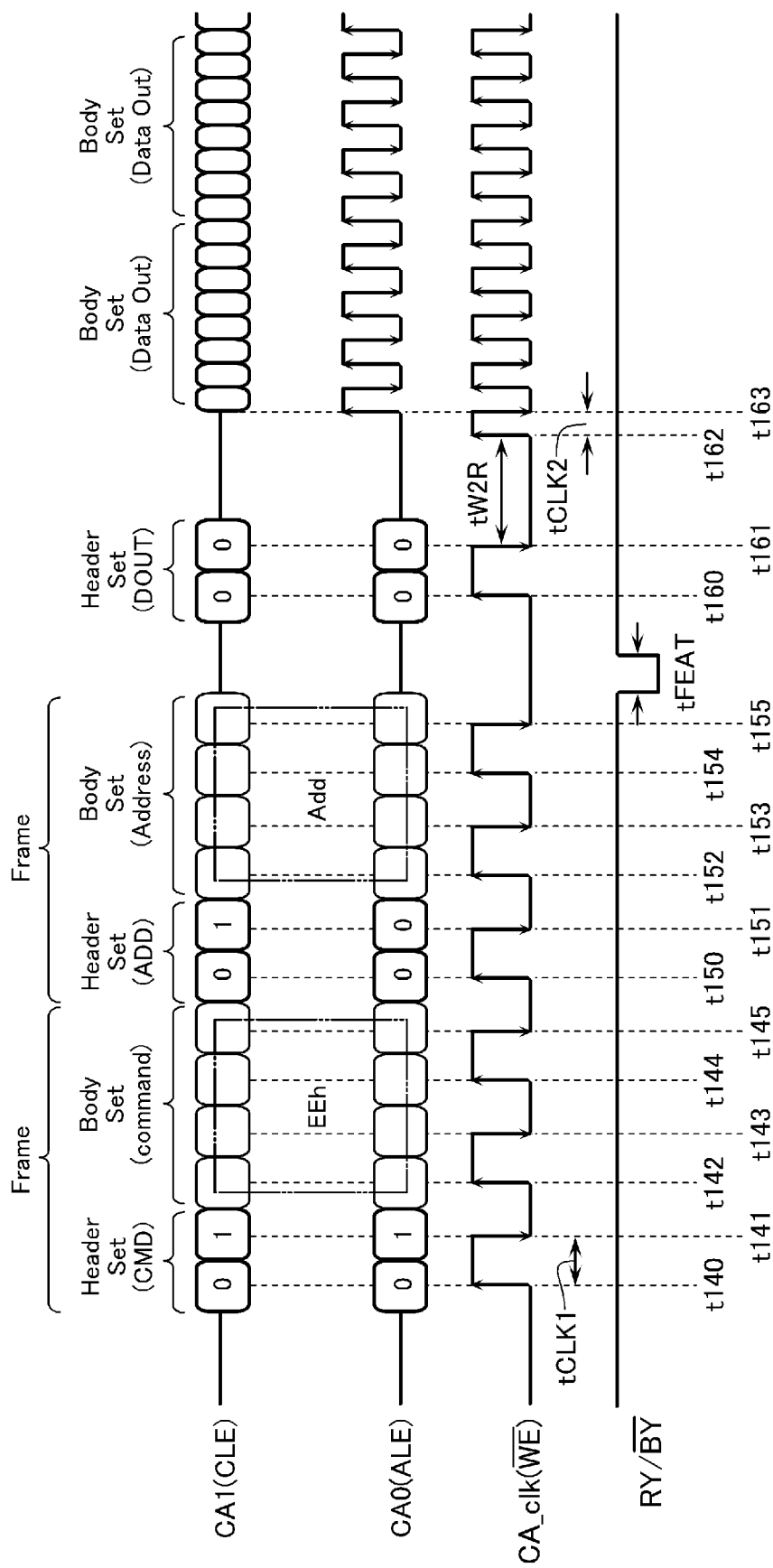
Figure 16:
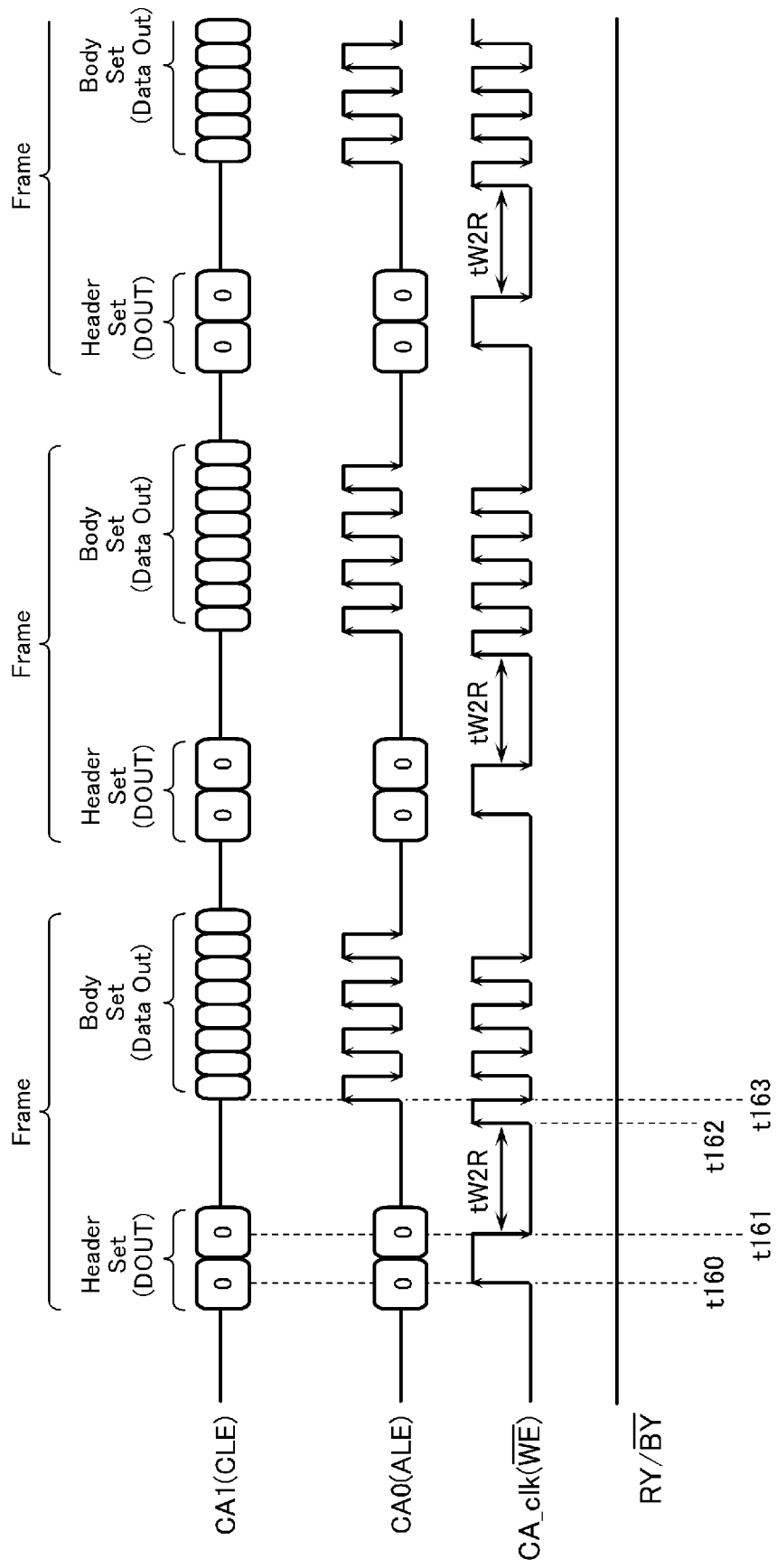

FIGS. 15 and 16 are schematic waveform diagrams indicating the signals exchanged between the controller die CD and the memory die MD. FIG. 15 illustrates an example in which the get feature operation is executed when the memory die MD operates in the normal mode. FIG. 16 illustrates another example of a part of the get feature operation part.

Though not illustrated, it is assumed that the voltage of the control terminal/CE has been previously fallen from "H" to "L" before a timing t140 of FIG. 15.

In the example of FIG. 15, at the timings t140 to t141, the controller die CD inputs the header set including the first cycle indicating bits of "0" and "0" and the second cycle indicating bits of "1" and "1" to the memory die MD via the control terminals CA1 (CLE) and CA0 (ALE). As illustrated in FIG. 11, this header set is a header set for instructing to input the command data Cmd. The header set is input at the rising edge and the falling edge of the signal input to the control terminal CA_clk (/WE).

Also, at timings t142 to t145, the controller die CD inputs the command data EEh as the body set to the memory die MD via the control terminals CA1 (CLE) and CA0 (ALE). The command data of "EEh" is the command data Cmd for instructing the get feature operation. When the command data EEh is input, the get feature operation is executed in all of the memory dies MD when "L" is input to the control terminal/CE. While the command data of "EEh" is described as an example, other kinds of command data such as "D4h" for instructing the get feature operation to one of the memory dies MD may be similarly input.

Also, at timings t150 to t151, the controller die CD inputs the header set including the first cycle indicating bits of "0" and "0" and the second cycle indicating bits of "1" and "0" to the memory dies MD via the control terminals CA1 (CLE) and CA0 (ALE). As illustrated in FIG. 11, this header set is a header set for instructing to input the address data Add. The header set is input at the rising edge and the falling edge of the signal input to the control terminal CA_clk (/WE).

Also, at timings t152 to t155, the controller die CD inputs the address data Add as the body set to the memory die MD via the control terminals CA1 (CLE) and CA0 (ALE). This address data Add is data for specifying a part in the feature register FR where the feature data Fd that is intended to be output is stored.

After a predetermined period of time elapses from the timing t155, during the period tFEAT when the voltage of the terminal RY/BY falls once and then falls once again, for example, a control parameter of the memory die MD is read as the feature data Fd from the designated part in the feature register FR.

Also, at timings t160 to t161, the controller die CD inputs header set including the first cycle indicating bits of "0" and "0" and the second cycle indicating bits of "0" and "0" to the memory die MD, via the control terminals CA1 (CLE) and CA0 (ALE). As illustrated in FIG. 11, this header set is a header set for instructing to output data. The header set is input at the rising edge and the falling edge of the signal input to the control terminal CA_clk (/WE).

After elapse of a predetermined standby time (after a period tW2R) from the input of this header set, the controller die CD switches (toggles) the input signal of the control terminal CA_clk (/WE) to cause the memory die MD to output data. More specifically, at a timing t160, the controller die CD switches the input signal of the control terminal CA_clk (/WE) from "L" to "H". Also, at a timing t161, the controller die CD switches the input signal of the control terminal CA_clk (/WE) from "H" to "L" and then repeats the switching (toggle). Then, the feature data Fd obtained by the get feature operation is output in response to the rising edge and the falling edge of the input signal of CA0 (ALE) via the control terminal CA1 (CLE). For example, an interval between the timings of the rising edge and the falling edge of the signal input to the control terminal CA_clk (/WE) and an interval between the timings of the falling edge and the rising edge of the signal input to the control terminal CA_clk (/WE) are periods tCLK2. That is, the toggle interval of the control terminal CA_clk (/WE) is the period tCLK2. As the signal of the control terminal CA0 (ALE) rises or falls along with the output of 1-bit data via the control terminal CA1 (CLE) of the memory die MD, the control die CD can determine the sections between neighboring two bits of the data even when "0" or "1" is output successively.

As illustrated in FIG. 15, a plurality of body sets of the feature data Fd may be successively output following one of the header set for instructing to output data. That is, the subsequent input of the header set may be omitted until the output of the entire feature data Fd is completed. Alternatively, as illustrated in FIG. 16, each of the body sets of the feature data Fd may be output following a corresponding one of the header sets for instructing to output data.

Status Read Operation in Normal Mode

Figure 17:
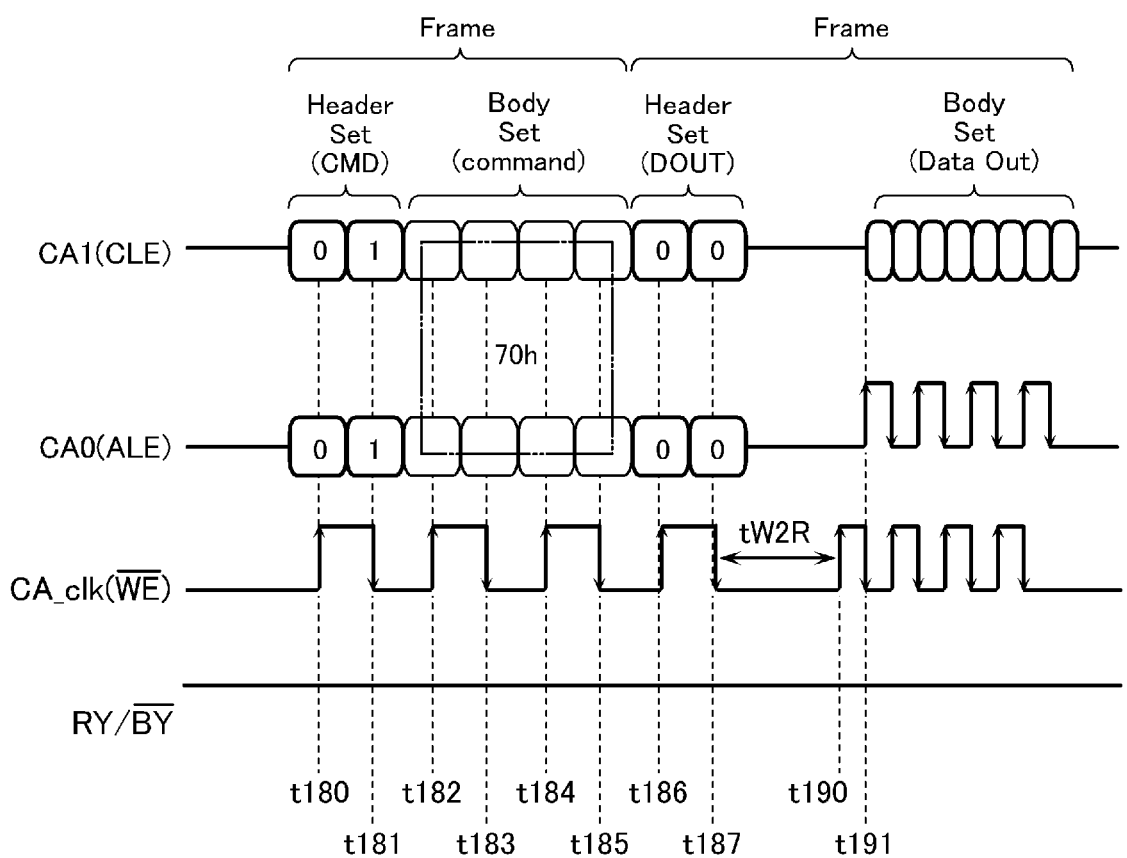

FIG. 17 is a schematic waveform diagram illustrating signals exchanged between the controller die CD and the memory die MD. FIG. 17 illustrates a schematic timing chart when the memory die MD operates in a normal mode, and the status read operation is executed.

It is assumed that the voltage of the control terminal/CE has been previously fallen from "H" to "L" before a timing t180 of FIG. 17.

In the example of FIG. 17, at timings t180 to t181, the controller die CD inputs the header set including the first cycle indicating bits of "0" and "0" and the second cycle indicating bits of "1" and "1" to the memory die MD via the control terminals CA1 (CLE) and CA0 (ALE). As illustrated in FIG. 11, this header set is a header set for instructing to input the command data Cmd. The header set is input while toggling the signal input to the control terminal CA_clk (/WE) two times. That is, the first cycle of the header set is input at the rising edge (toggling) of the signal input to the control terminal CA_clk (/WE), and the second cycle of the header set is input at the falling edge (toggling) of the signal input to the control terminal CA_clk (/WE).

Also, at timings t182 to t185, the controller die CD inputs the command data 70h as the body set to the memory die MD via the control terminals CA1 (CLE) and CA0 (ALE). The command data of "70h" is the command data Cmd for instructing status read operation. When the command data 70h is input, for example, the status read operation is executed in the memory die MD to which command set is input immediately before.

Also, at timings t186 to t187, when the controller die CD inputs the header set including the first cycle indicating bits of "0" and "0" and the second cycle indicating bits of "0" and "0" to the memory dies MD via the control terminals CA1 (CLE) and CA0 (ALE). As illustrated in FIG. 11, this header set is a header set for instructing to output data. The header set is input at the rising edge and the falling edge of the signal input to the control terminal CA_clk (/WE).

After elapse of the predetermined standby time (after the period tW2R) from the input of this header set, the controller die CD switches (toggles) the input signal of the control terminal CA_clk (/WE) to cause the memory die MD to output data. Accordingly, the status data Stt obtained in the status read operation is output in response to the rising edge and the falling edge of the input signal of CA0 (ALE) via the control terminal CA1 (CLE). The signal of the control terminal CA0 (ALE) rises or falls in synchronization with output of 1-bit data through the control terminal CA1 (CLE). Therefore, even when "0" is output successively from the control terminal CA1 (CLE) or when "1" is output successively, the section of data can be determined.

Example of Header Set Input in Ready/Busy Output Mode

Figure 18:
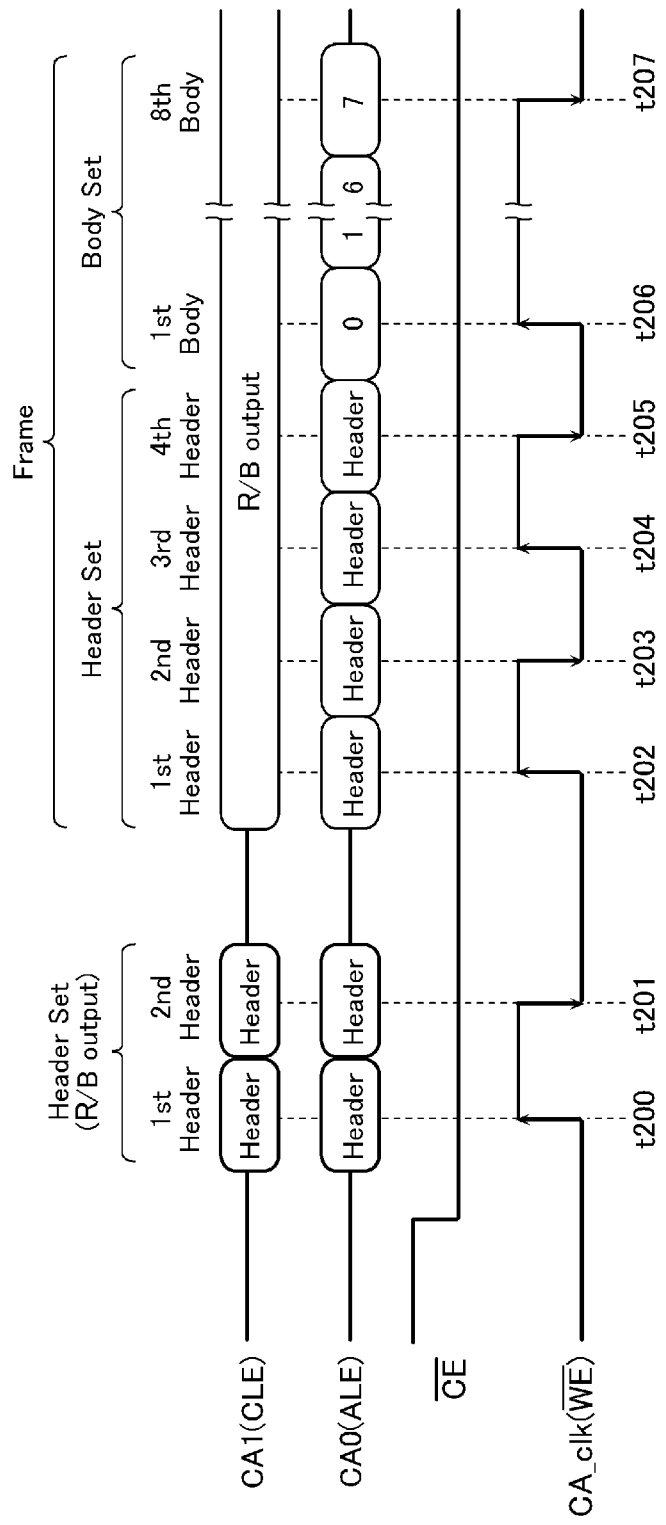

FIG. 18 is a schematic waveform diagram indicating the signals exchanged between the controller die CD and the memory die MD. FIG. 18 illustrates a schematic timing chart when the memory die MD operates in a ready/busy output mode.

It is assumed that the voltage of the control terminal/CE has been previously fallen from "H" to "L" before a timing t200 of FIG. 18.

Also, at timings t200 to t201, the controller die CD inputs a header set including the first cycle of 2 bits and the second cycle of 2 bits to the memory die MD via the control terminals CA1 (CLE) and CA0 (ALE). In the example of FIG. 18, a header set including the first cycle indicating bits of "0" and "1" and the second cycle indicating bits of "0" and "1" are input. This header set is a header set for instructing the start of the output of the ready/busy state as illustrated in FIG. 11. That is, this header set indicates the ready/busy output mode start instruction. The header set is input at the rising edge and the falling edge of the signal input to the control terminal CA_clk (/WE).

In this manner, the ready/busy output mode start instruction for instructing to output the ready/busy state of the memory die MD can be performed by inputting a header set while appropriately switching the signal input to the control terminal CA1 (CLE) and the signal input to the control terminal CA0 (ALE).

Upon input of this header set, at a timing t202, the output of the ready/busy state of the memory die MD through the control terminal CA1 (CLE) is started. That is, the operation mode of the memory die MD is switched from the normal mode to the ready/busy output mode. The output of the ready/busy state of the memory die MD is continued after the timing t202 until the voltage of the control terminal/CE rises from "L" to "H". That is, when the ready/busy output mode start instruction is received, the memory die MD continues to output the ready/busy information from the control terminal CA1 (CLE) after the timing t202 until the voltage of the control terminal/CE rises from "L" to "H". As illustrated in FIG. 18, the output of the ready/busy state of the memory die MD is asynchronous with the toggled input signal of the control terminal CA_clk (/WE).

Meanwhile, the control terminal CA0 (ALE) can be used for inputting the command data Cmd and the address data Add and outputting data such as the status data Stt according to the toggled input signal of the control terminal CA_clk (/WE). In the example of FIG. 18, at the timings t202 to t205, the 4-bit header set is input via the control terminal CA0 (ALE) with the rising edge and the falling edge of the signal input to the control terminal CA_clk (/WE).

More specifically, at the timings t202 to t205, the controller die CD divides the 4-bit header set illustrated in FIG. 11 into four cycles and inputs the 4-bit header set by one bit for each cycle to the memory die MD via the control terminal CA0 (ALE). For example, when it is instructed to input the 8-bit command data Cmd in the body set, voltages of the control terminals CA1 (CLE) and CA0 (ALE) in accordance with bits of "0", "0", "1", and "1" are set at the rising edge and the falling edge of the signal input to the control terminal CA_clk (/WE) and are received in the register (not illustrated) of the logic circuit CTR.

Also, at timings t206 to t207, the controller die CD divides the 8-bit body set into eight cycles and inputs the 8-bit body set by one bit for each cycle at the rising edge and the falling edge of the signal input to the control terminal CA_clk (/WE) and are received in the command register CMR, the address register ADR, the feature register FR, or the like. More specifically, at the timings t206 to t207, the controller die CD divides the 8-bit body set in accordance with the 4-bit header set (entry condition) into eight cycles and inputs the 8-bit body set by one bit for each cycle to the memory die MD via the control terminal CA0 (ALE). For example, the 8-bit command data Cmd is set to bits of "0" to "7". First, the first cycle of the body set is received at the timing t206 (rising edge) when the voltage of the control terminal CA0 (ALE) is set according to a bit of "0", and the control terminal CA_clk (/WE) rises from "L" to "H". On the other hand, the final cycle (eighth cycle) of the body set is received at the timing t207 (falling edge) when the voltage of the control terminal CA0 (ALE) is set according to a bit of "7", and the control terminal CA_clk (/WE) falls from "H" to "L". Similarly, the second cycle to seventh cycle of the body set are also received at the timings when the voltage of the control terminal CA0 (ALE) is set according to bits of "1" to "6", and the control terminal CA_clk (/WE) falls (falling edge) or rises (rising edge), respectively.

There may be a time lag from when the second cycle of the header set is input at the timing t201 to when the memory die MD is switched from the normal mode to the ready/busy output mode and the output of ready/busy information starts from the control terminal CA1 (CLE). Also, there may be a time lag from when the second cycle of the header set is input at the timing t201 to when the header set of the command data Cmd for another operation is allowed to input to the memory die MD through the control terminal CA0 (ALE.

Set Feature Operation of Ready/Busy Output Mode

Figure 19:
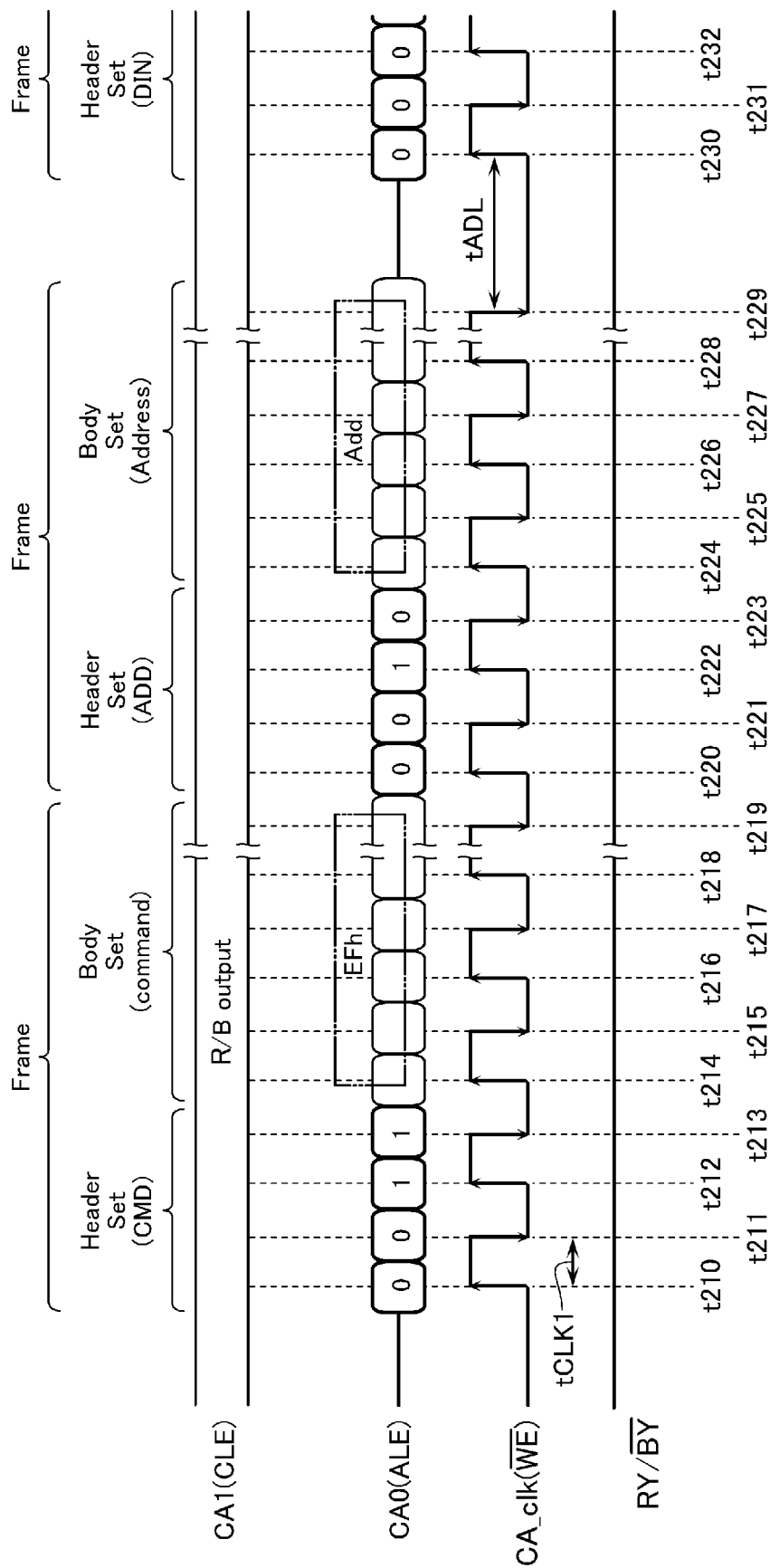
Figure 20:
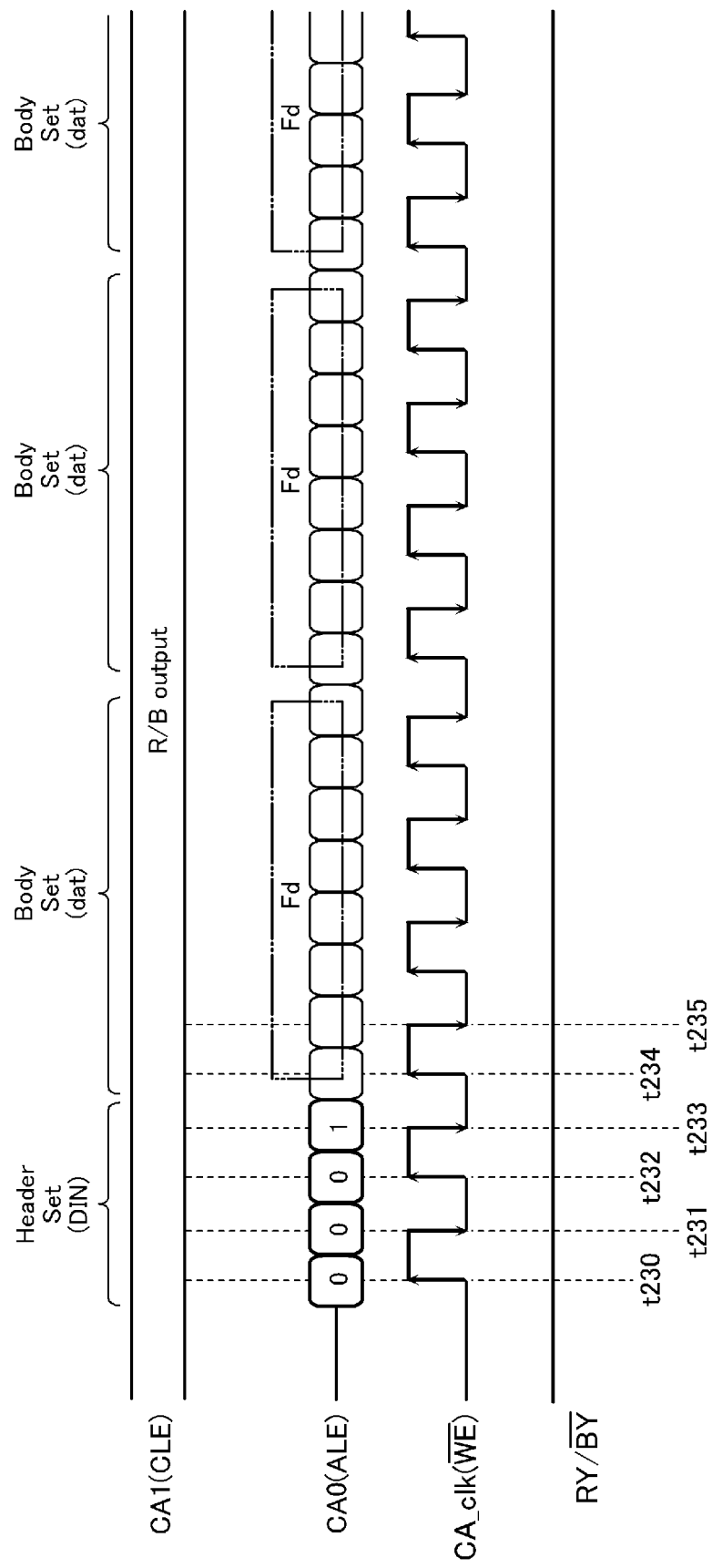
Figure 21:
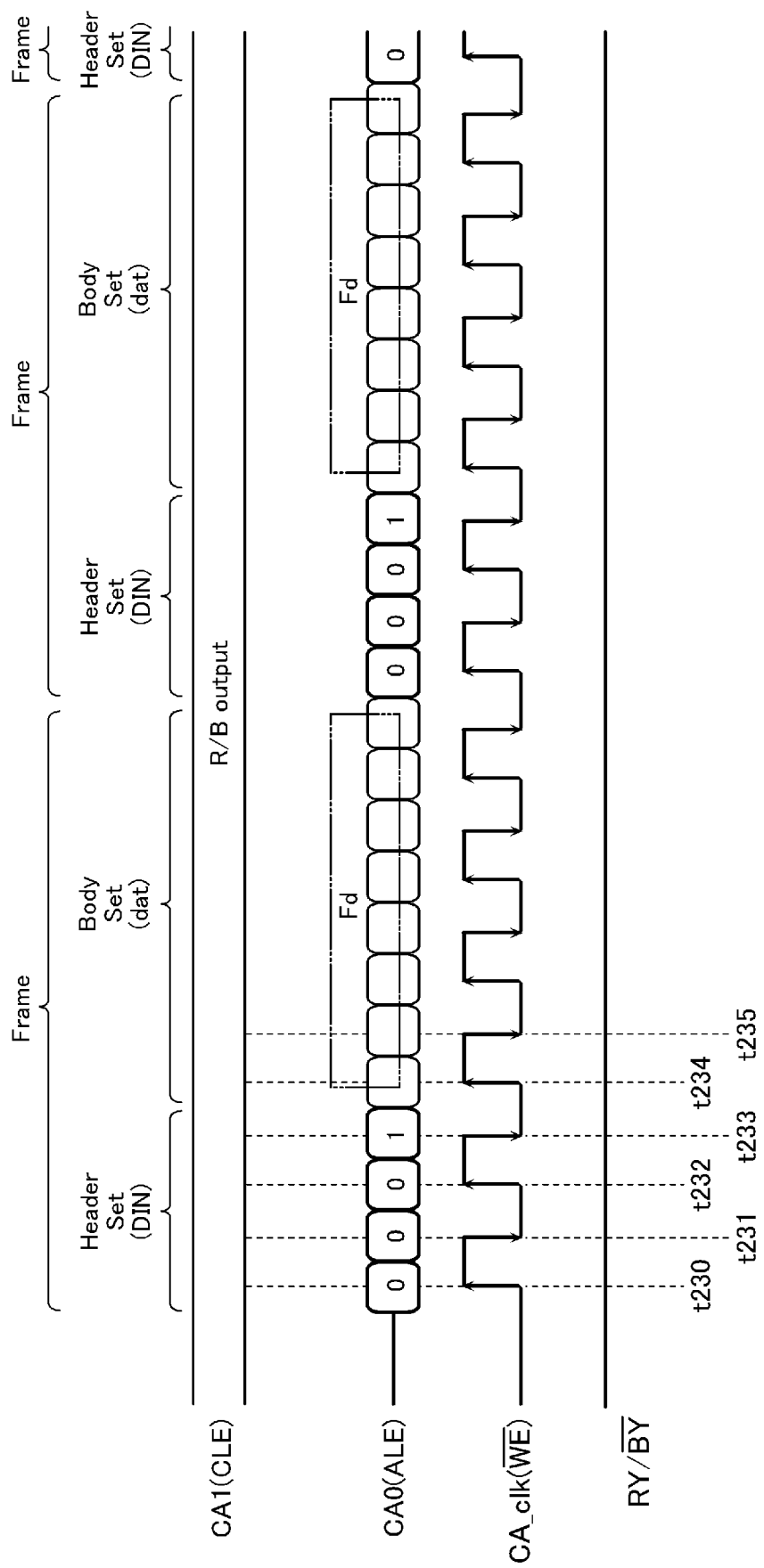

FIGS. 19 to 21 are schematic waveform diagrams illustrating signals exchanged between the controller die CD and the memory die MD. FIG. 19 illustrates a schematic timing chart when the memory die MD operates in the ready/busy output mode, and the set feature operation is executed while the ready/busy information is output. FIG. 19 illustrates the waveform. FIG. 20 illustrates an example of a waveform corresponding to an end part of the waveform illustrated in FIG. 19. FIG. 21 illustrates another example of a waveform corresponding to an end part of the waveform illustrated in FIG. 19.

The example of FIG. 19 indicates the state in which, before the timing t210, the controller die CD inputs the header set indicating the ready/busy output start instruction to the memory die MD via the control terminals CA1 (CLE) and CA0 (ALE), and the output of the ready/busy state of the memory die MD is continued through the control terminal CA1 (CLE).

At the timings t210 to t213, a header set indicating bits of "0", "0", "1", and "1" is input through the control terminal CA0 (ALE). As illustrated in FIG. 11, this header set is a header set for instructing to input the command data Cmd. This header set is divided into four cycles and input by one bit for each cycle at the rising edge and the falling edge of the signal input to the control terminal CA_clk (/WE).

At timings t214 to t219, the command data EFh as the body set is input through the control terminal CA0 (ALE). As described above, the command data of "EFh" is the command data Cmd for instructing the set feature operation. This body set is divided into eight cycles, and is input by one bit for each cycle at the rising edge and the falling edge of the signal input to the control terminal CA_clk (/WE).

Also, the header set indicating bits of "0", "0", "1", and "0" is input to the control terminal CA0 (ALE) at timings t220 to t223. As illustrated in FIG. 11, this header set is a header set for instructing to input the address data Add. This header set is divided into four cycles, and is input by one bit for each cycle at the rising edge and the falling edge of the signal input to the control terminal CA_clk (/WE).

At timings t224 to t229, the address data Add as the body set is input through the control terminal CA0 (ALE). This address data Add is data for specifying a part (a parameter set in the set feature operation and the like) to which the feature data Fd is to be input in the feature register FR, is divided into eight cycles, and is input by one bit for each cycle at the rising edge and the falling edge of the signal input to the control terminal CA_clk (/WE).

After timing t229, the rise of the signal input to the control terminal CA_clk (/WE) is deferred by the period tADL to secure time to specify the feature register FR so that feature data Fd is reliably input to a designated part in the specified feature register FR.

In an example illustrated in FIG. 20, after the header set for instructing to input data is input once, a plurality of body sets that configure the feature data Fd are successively input. That is, the successive input of the header set is omitted until the entire feature data Fd are input. On the other hand, in an example illustrated in FIG. 21, input of a frame including both of the header set and the body set are repeated until the entire feature data Fd are input.

Get Feature Operation in Ready/Busy Output Mode

Figure 22:
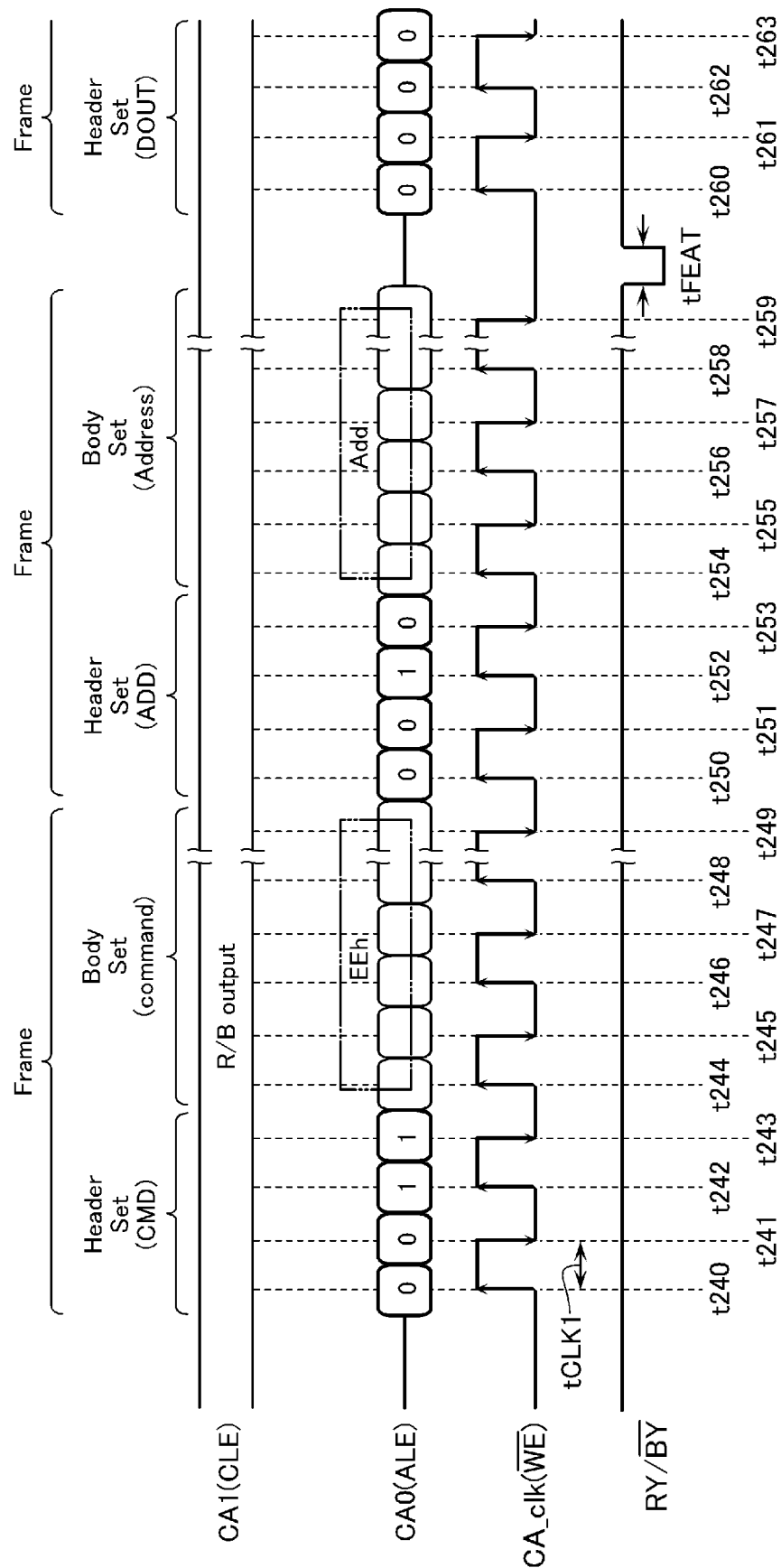
Figure 23:
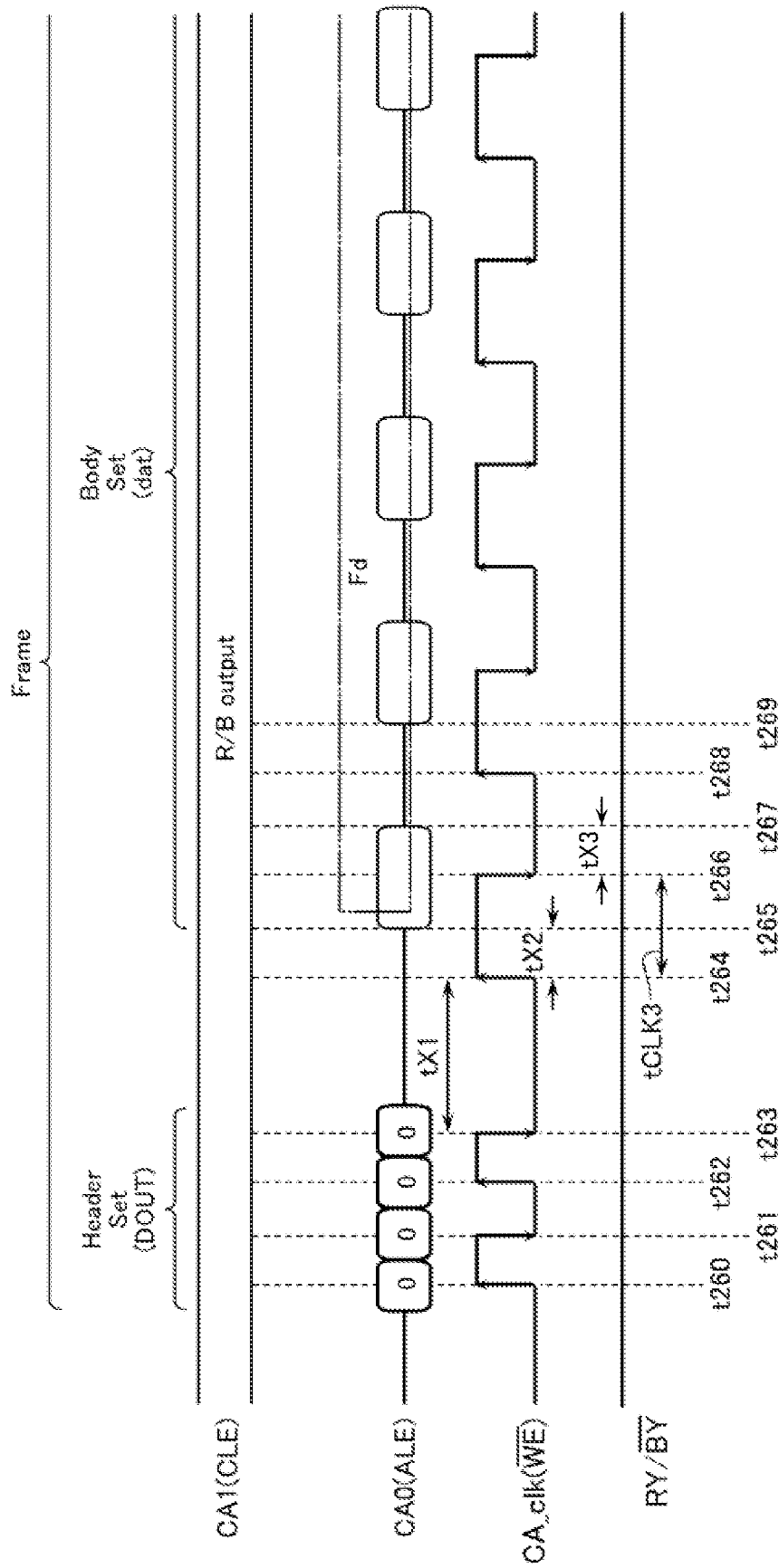

FIGS. 22 and 23 are schematic waveform diagrams indicating the signals exchanged between the controller die CD and the memory die MD. FIGS. 22 and 23 illustrate schematic timing charts when the memory die MD operates in the ready/busy output mode and executes the get feature operation while outputting the ready/busy information. FIG. 23 illustrates the continuation of the waveform illustrated in FIG. 22.

The example of FIG. 22 assumes that the state in which the controller die CD inputs the header set indicating the ready/busy output start instruction to the memory die MD before timing t240 through the control terminals CA1 (CLE) and CA0 (ALE), and the output of the ready/busy state of the memory die MD at the control terminal CA1 (CLE) has been started and is continuing.

At the control terminal CA0 (ALE), at timings t240 to t243, the header set indicating bits of "0", "0", "1", and "1" is input. As illustrated in FIG. 11, this header set is a header set for instructing to input the command data Cmd. This header set is divided into four cycles, and is input by one bit for each cycle at the rising edge and the falling edge of the signal input to the control terminal CA_clk (/WE).

At timings t244 to t249, the command data EEh as the body set is input through the control terminal CA0 (ALE). As described above, the command data of "EEh" is the command data Cmd for instructing the get feature operation This body set is divided into eight cycles, and is input by one bit for each cycle at the rising edge and the falling edge of the signal input to the control terminal CA_clk (/WE).

At timings t250 to t253, the header set indicating bits of "0", "0", "1", and "0" is input through the control terminal CA0 (ALE). As illustrated in FIG. 11, this header set is a header set for instructing to input the address data Add. This header set is divided into four cycles, and is input by one bit for each cycle at the rising edge and the falling edge of the signal input to the control terminal CA_clk (/WE).

At timings t254 to t259, the address data Add as the body set is input through the control terminal CA0 (ALE). This address data Add is data for specifying the feature data Fd. This body set is divided into eight cycles, and is input by one bit for each cycle at the rising edge and the falling edge of the signal input to the control terminal CA_clk (/WE).

After the timing t259, a control parameter of the memory die MD or the like stored in the designated part in the feature register FR as the feature data Fd is read in the period tFEAT after the voltage of the terminal RY/BY falls once and then falls once again.

Thereafter, at timings when the signal input to the control terminal CA_clk (/WE) rises (rising edge) and falls (falling edge), the header set indicating bits of "0", "0", "0", and "0" is input through the control terminal CA0 (ALE). This header set is a header set for instructing to output data as illustrated in FIG. 11, is divided into four cycles. This header set is input by one bit for each cycle at the rising edge and the falling edge of the signal input to the control terminal CA_clk (/WE).

As illustrated in FIG. 23, after elapse of a predetermined standby time period tX1 from the input of this header set, the feature data Fd obtained in the get feature operation is output through the control terminal CA0 (ALE) at the rising edge and the falling edge of the signal input to the control terminal CA_clk (/WE). In FIG. 23, when the memory die MD operates in the ready/busy output mode, time from the rising edge of the control terminal CA_clk to the start of output of a corresponding part of the feature data Fd (1 bit) (a time required to start output of the feature data Fd after the rising edge of the control terminal CA_clk) is indicated as tX2. In addition, time from the falling edge of the control terminal CA_clk to the stop of the output of the corresponding part of the feature data Fd (1 bit) (a time for which output of the feature data Fd is continued after the falling edge of the control terminal CA_clk) is indicated as tX3.

In the example of FIG. 23, a period (toggle period) between the rising edge and the falling edge of the control terminal CA_clk in outputting of the feature data Fd is indicated as tCLK3. The period tCLK3 may be longer than the period (toggle period) tCLK1 between the rising edge and the falling edge of the control terminal CA_clk in inputting of the header set or the like from the controller die CD to the memory die MD. Also, the period tCLK3 may be longer than the period (toggle period) tCLK2 (see FIG. 15) between the rising edge to the falling edge of the control terminal CA_clk in outputting of the feature data Fd when the memory die MD operates in a normal mode.

Here, when the memory die MD operates in the ready/busy output mode, as the ready/busy state of the memory die MD needs to be continuously output from the control terminal CA1 (CLE). In this case, it is not possible to output the feature data Fd from the control terminal CA0 (ALE) in the same manner with reference to FIG. 15, as there is no room for outputting a timing control signal (e.g., toggling signal through the control terminal CA0 (ALE) shown in FIG. 15 after the timing t163) from the memory die MD as a result of continuous output of the ready/busy state from the control terminal CA0 (ALE).

The plurality of body sets of the feature data Fd may be successively output following one of the header set for instructing to output data. That is, the subsequent input of the header set may be omitted until the output of the entire feature data Fd is completed. Also, each of the body sets of the feature data Fd may be output following a corresponding one of the header sets for instructing to output data.

Effect

Figure 24:
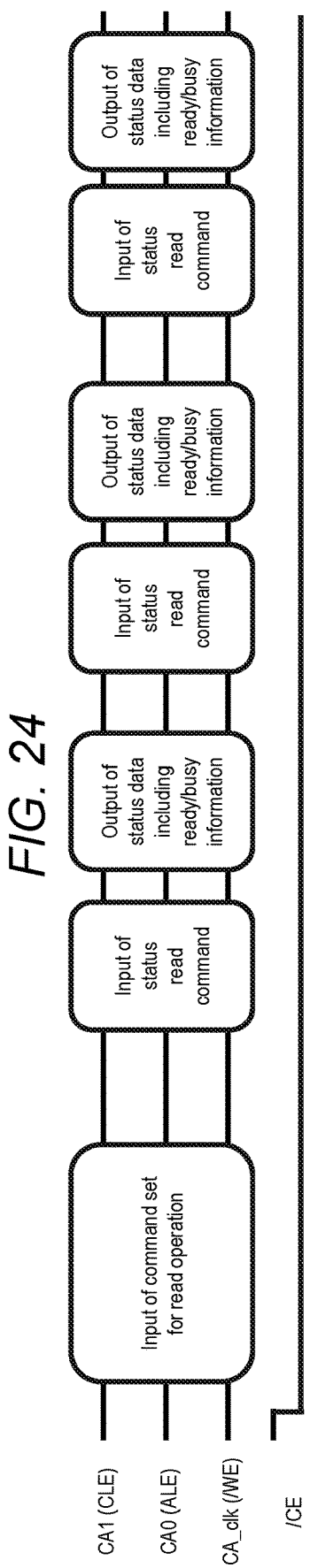

For example, in the package PKG as described with reference to FIGS. 2A and 2B, the corresponding pad electrodes P of the plurality of memory dies MD are commonly connected. When the pad electrodes P corresponding to the terminals RY/BY of the plurality of memory dies MD are commonly connected, while the controller die CD can detect that the terminal RY/BY is in an "L" state in any one of the plurality of memory dies MD, it is not possible to independently detect that the terminal RY/BY is in the "L" state in a particular one of the plurality of memory dies MD. In view of this, when the memory die MD operates in the normal mode, the status read operation may be required for checking the ready/busy state of the particular memory die MD. However, as described with reference to FIG. 17, the status read operation may require a CMD cycle and a DOUT cycle through the control terminals CA1 (CLE) and CA0 (ALE). In this case, for example, the additional process of inputting the command data Cmd is necessitated, and it may result in a large delay (overhead) in the total operation time. Here, the CMD cycle is a 6-cycle frame corresponding to the input of command data Cmd. The DOUT cycle is a 6-cycle frame corresponding to the output of data. Further, while the status read operation is executed, the control terminals CA1 (CLE) and CA0 (ALE) cannot be used for other operations, such as inputting the command data Cmd or the address data Add for designating other operations. FIG. 24 schematically illustrates this situation.

Figure 25:
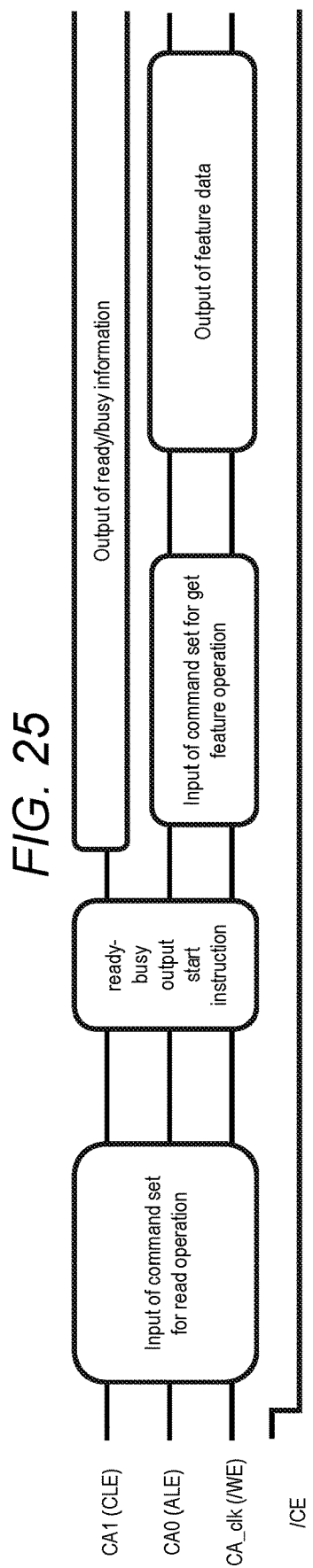

The semiconductor storage device according to the present embodiment can operate not only in the normal mode but also in the ready/busy output mode. For example, the controller die CD inputs the header set of two cycles for instructing to start outputting the ready/busy state of the memory die MD (ready/busy output start) via the control terminals CA1 (CLE) and CA0 (ALE) in order to switch the memory die MD from the normal mode to the ready/busy output mode. When the memory die MD operates in the ready/busy output mode, the memory die MD can receive an input of the command data Cmd or the address data Add at the control terminal CA0 (ALE) while outputting the ready/busy information from the control terminal CA1 (CLE). As the additional process for executing the status read operation is omitted and inputting of the command data Cmd or the address data Add for designating other operations is allowed, a delay (overhead) in the total operation time can be reduced. FIG. 25 schematically illustrates this situation.

In the semiconductor storage device according to the present embodiment, the header set are input via the control terminals CA1 (CLE) and CA0 (ALE). In this case, two bits are input in parallel at one cycle. Furthermore, in the semiconductor storage device according to the present embodiment, signals through the control terminals CA1 (CLE) and CA0 (ALE) are received at both of the rising edge and the falling edge of the signal input to the control terminal CA_clk (/WE). In other words, a combination of the rising edge and the falling edge defines two cycles. In this manner, as compared with a case where signals through the control terminals CA1 (CLE) and CA0 (ALE) are received at either one of the rising edge or the falling edge of the signal input to the control terminal CA_clk (/WE) (a case where a combination of the rising edge and the falling edge defines one cycle), it is possible to reduce the period required to input the frame and speed up the operation.

Figure 26:
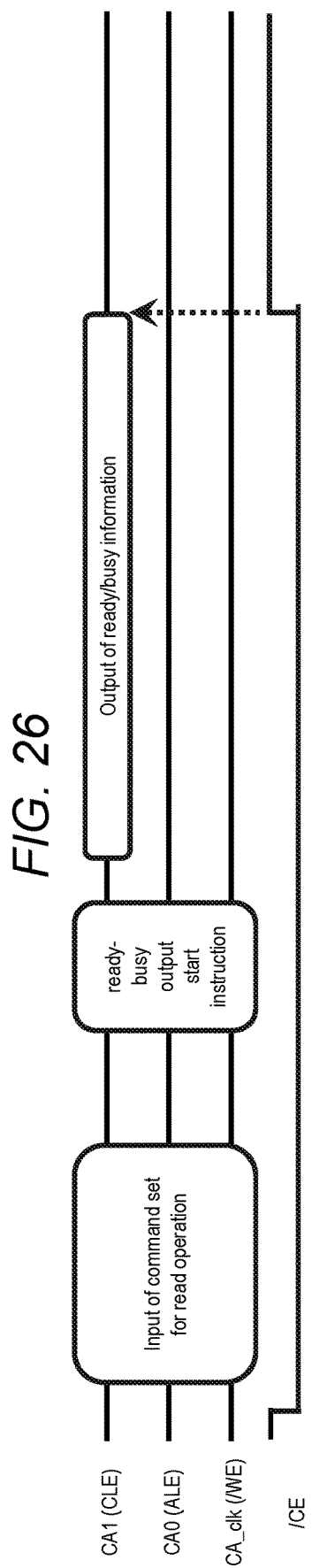

In the semiconductor storage device according to the present embodiment, the memory die MD starts outputting the ready/busy information upon receiving the ready/busy output mode start instruction in a state in which the voltage of the control terminal/CE has been previously fallen from "L" to "H". Then, the memory die MD ends outputting the ready/busy information when the voltage of the control terminal/CE rises from "L" to "H". In this manner, it is possible to switch the operation mode of the memory die MD with flexibility. FIG. 26 schematically illustrates this situation.

OTHERS

In the description of the above embodiment, an example of inputting a header set of the ready/busy output start instruction via the control terminals CA1 (CLE) and CA0 (ALE) is provided. In addition, each of the memory dies MD may be further configured to accept instruction to start and stop operating in the ready/busy output mode through the. In this case, for example, in a case where one of the plurality of memory dies MD commonly connected operates in the ready/busy output mode, upon input of the header set of the ready/busy output start instruction directed to another one of the plurality of memory dies MD via the control terminal CA0 (ALE), the operation in the ready/busy output mode of the one of the memory dies MD stops, and the another one of memory dies MD starts operating in the ready/busy output mode.

The above embodiment assumes that 4-bit combinations of the header set are defined as illustrated in FIG. 11. However, definition of the 4-bit combinations of header set are not limited to the example of FIG. 11. For example, while FIG. 11 illustrates that the header set of the ready/busy output start instruction is the combination of bits of "0", "1", "0", and "1", the combination of bits of "0", "1", "1", and "0" and the like can be used, the combination of bits can be adjusted appropriately. The same is applied to the other combinations correlated with other kinds of instructions.

Also, in the normal mode, both the rising edge and the falling edge (two times of toggling) of the signal input to the control terminal CA_clk (/WE) is used to control data input to or output from the memory die MD. However, either one of the rising edge or the falling edge (either one of two times of toggling) of the signal input to the control terminal CA_clk (/WE) may be used to control data input to or output from the memory die MD. In this manner, while speed in receiving/transmitting a signal may be lowered, for example, reliability in receiving/transmitting a signal may increase.

An example in which, when the memory die MD operates in a normal mode, 2-bit data is input or output by using the control terminals CA1 (CLE) and CA0 (ALE) is provided. However, this is an example, and it can be adjusted as appropriate. For example, when the memory die MD operates in the normal mode, data of three or more bits may be input or output at each cycle by using other terminals (for example, the control terminal/WP described with reference to FIG. 4 or the like) in addition to the control terminals CA1 (CLE) and CA0 (ALE). For example, assuming a case in which the control terminal/WP is used in addition to the control terminals CA1 (CLE) and CA0 (ALE), in the ready/busy output mode, one of the control terminals CA1 (CLE), CA0 (ALE) and/WP may be selected and used to continue outputting the ready/busy information while allowing input/output of 1-bit or 2-bit signal through the remaining one or two of control terminals. Alternatively, for example, the control terminals CA1 (CLE) and CA0 (ALE) may be dedicated for input of the header set such as a header set of the ready/busy output start instruction, and the control terminal/WP may be dedicated for output of ready/busy information. In this case, configuration of receivers/drivers as illustrated in FIG. 8 may be simplified.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
    a plurality of semiconductor storage devices each including:
        first and second signal pads through which command data and address data for instructing one of the semiconductor storage devices to perform a read operation are transmitted;
        a memory cell array including a string in which a plurality of memory cell transistors are connected in series; and
        a status register; and
    a controller device configured to instruct the one of the semiconductor storage devices to provide a status of the read operation executed by the one of the semiconductor storage devices,
    wherein
    the one of the semiconductor storage devices is configured to, upon receiving the instruction to provide the status of the read operation, output a ready/busy state of the one of the semiconductor storage devices that is stored in the status register through the first signal pad while allowing an input of another command data and another address data through the second signal pad.

2. The memory system according to claim 1,
    wherein each of the semiconductor storage devices further includes
        a third signal pad through which a timing control signal is transmitted during transmission of the command data and the address data for instructing the one of the semiconductor storage devices to perform the read operation,
    wherein the command data and the address data for instructing the one of the semiconductor storage devices to perform the read operation are transmitted from the controller device to the first and second signal pads of the one of the semiconductor storage devices along with toggling of the timing control signal transmitted through the third signal pad,
    wherein the controller device instructs the one of the semiconductor storage devices to provide the status of the read operation executed by the one of the semiconductor storage devices by transmitting a signal through at least one of the first and second signal pads while toggling the timing control signal twice or more.

3. The memory system according to claim 2,
    wherein the signal is transmitted through the first and second signal pads in a time-division manner and includes two or more sets of data.

4. The memory system according to claim 2,
    wherein the ready/busy state of the one of the semiconductor storage devices is output through the first signal pad asynchronously with respect to toggling of the timing control signal.

5. The memory system according to claim 2,
    wherein each of the semiconductor storage devices further includes
        a fourth signal pad through which a chip enable signal is transmitted,
    wherein the one of the semiconductor storage devices
        starts outputting of the ready/busy state of the one of the semiconductor storage devices through the first signal pad upon receiving the instruction in a state in which the chip enable signal transmitted through the fourth signal pad is set to a first level, and
        ends the outputting of the ready/busy state of the one of the semiconductor storage devices through the first signal pad when the chip enable signal transmitted through the fourth signal pad transitions into a second level which is logically opposite to the first level.

6. The memory system according to claim 1,
    wherein the controller device is further configured to, after instructing the one of the semiconductor storage devices to provide the status of the read operation, send an instruction to the one of the semiconductor storage devices through the second signal pad to output feature data of the one of the semiconductor storage devices, wherein the one of the semiconductor storage devices is further configured to, upon receiving the instruction to output the feature data, output the feature data to the controller device through the second signal pad while continuing output of the ready/busy state to the controller device through the first signal pad.

7. The memory system according to claim 6, wherein the feature data is indicative of an operational condition of the one of the semiconductor storage devices.

8. The memory system according to claim 6, wherein the feature data includes a control parameter for the one of the semiconductor storage devices.

9. A semiconductor storage device comprising:

first and second signal pads through which command data and address data for a read operation are transmitted to the semiconductor storage device;

a memory cell array including a string in which a plurality of memory cell transistors are connected in series;

a status register; and a sequencer configured to perform the read operation to one of the memory cell transistors, and upon receiving an instruction to provide a status of the read operation executed by the semiconductor storage device, output a ready/busy state of the semiconductor storage device that is stored in the status register through the first signal pad while allowing an input of another command data and another address data to the semiconductor storage device through the second signal pad.

10. The semiconductor storage device according to claim 9, further comprising:

a third signal pad through which a timing control signal is transmitted during transmission of the command data and the address data, wherein the command data and the address data are input through the first and second signal pads along with toggling of the timing control signal transmitted through the third signal pad, wherein, during outputting of the ready/busy state through the first signal pad in response to the instruction to provide the status of the read operation, the another command data and the another address data are input through the second signal pad along with toggling of the timing control signal transmitted through the third signal pad.

11. The semiconductor storage device according to claim 10, wherein each of the command data and the address data are input through the first and second signal pads in a time-division manner and include two or more sets of data.

12. The semiconductor storage device according to claim 10, wherein the ready/busy state is output through the first signal pad asynchronously with respect to toggling of the timing control signal.

13. The semiconductor storage device according to claim 10, further comprising:

a fourth signal pad through which a chip enable signal is transmitted, wherein the outputting of the ready/busy state through the first signal pad is started upon receiving the instruction in a state in which the chip enable signal transmitted through the fourth signal pad is set to a first level, and wherein the outputting of the ready/busy state through the first signal pad ends when the chip enable signal transmitted through the fourth signal pad transitions into a second level which is logically opposite to the first level.

14. The semiconductor storage device according to claim 9, wherein the another command data and the another address data input through the second signal pad include an instruction to output feature data, and wherein, upon receiving the instruction to output the feature data, the feature data is output through the second signal pad while continuing output of the ready/busy state through the first signal pad.

15. The semiconductor storage device according to claim 14, wherein the feature data is indicative of an operational condition of the semiconductor storage device.

16. The semiconductor storage device according to claim 14, wherein the feature data includes a control parameter for the semiconductor storage device.

17. A method of operating a semiconductor storage device in response to an instruction to provide a status of a read operation executed by the semiconductor storage device, wherein the semiconductor storage device includes first and second signal pads through which command data and address data for a read operation are transmitted to the semiconductor storage device, a memory cell array including a string in which a plurality of memory cell transistors are connected in series, and a status register, the method comprising:

outputting a ready/busy state of the semiconductor storage device that is stored in the status register through the first signal pad while allowing an input of another command data and another address data to the semiconductor storage device through the second signal pad.

18. The method according to claim 17, wherein the semiconductor storage device further includes a third signal pad through which a timing control signal is transmitted during transmission of the command data and the address data, and wherein the method further comprising:

inputting the command data and the address data through the first and second signal pads along with toggling of the timing control signal transmitted through the third signal pad; and during the outputting of the ready/busy state through the first signal pad, inputting the another command data and the another address data through the second signal pad along with toggling of the timing control signal transmitted through the third signal pad.

19. The method according to claim 18, wherein each of the command data and the address data are input through the first and second signal pads in a time-division manner and include two or more sets of data.

20. The method according to claim 18, wherein the ready/busy state is output through the first signal pad asynchronously with respect to toggling of the timing control signal.

21. The method according to claim 18,
wherein the semiconductor storage device further includes
a fourth signal pad through which the chip enable signal is transmitted,
wherein the outputting of the ready/busy state through the first signal pad is started upon receiving the instruction in a state in which the chip enable signal transmitted through the fourth signal pad is set to a first level, and
wherein the outputting of the ready/busy state through the first signal pad ends when the chip enable signal transmitted through the fourth signal pad transitions into a second level which is logically opposite to the first level.

22. The method according to claim 17,
wherein the another command data and the another address data input through the second signal pad include an instruction to output feature data, and
wherein the method further comprising:
upon receiving the instruction to output the feature data, outputting the feature data through the second signal pad while continuing output of the ready/busy state through the first signal pad.

23. The method according to claim 22,
wherein the feature data is indicative of an operational condition of the semiconductor storage device.

24. The method according to claim 23,
wherein the feature data includes a control parameter for the semiconductor storage device.

\* \* \* \* \*